US010070418B2

(12) United States Patent
Liu et al.

(10) Patent No.: US 10,070,418 B2
(45) Date of Patent: *Sep. 4, 2018

(54) SIGNALING FOR MULTI-DIMENSION WIRELESS RESOURCE ALLOCATION

(71) Applicant: Marvell World Trade Ltd., St. Michael (BB)

(72) Inventors: Yong Liu, Campbell, CA (US); Raja Banerjea, Sunnyvale, CA (US); Hongyuan Zhang, Fremont, CA (US); Harish Ramamurthy, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 462 days.

This patent is subject to a terminal disclaimer.

(21) Appl. No.: 14/491,931

(22) Filed: Sep. 19, 2014

(65) Prior Publication Data

US 2015/0009940 A1 Jan. 8, 2015

Related U.S. Application Data

(63) Continuation of application No. 12/758,709, filed on Apr. 12, 2010, now Pat. No. 8,842,614.

(Continued)

(51) Int. Cl.
*H04W 24/00* (2009.01)
*H04W 72/04* (2009.01)
*H04L 5/00* (2006.01)

(52) U.S. Cl.
CPC ....... *H04W 72/0406* (2013.01); *H04L 5/0023* (2013.01); *H04L 5/0094* (2013.01); *H04L 5/0053* (2013.01); *H04W 72/046* (2013.01)

(58) Field of Classification Search
CPC ....... H04W 4/06; H04W 72/04; H04W 76/00; H04W 88/08; H04W 24/00

(Continued)

(56) References Cited

U.S. PATENT DOCUMENTS 7,804,800 B2 9/2010 Li et al.
8,467,345 B2 6/2013 Abraham et al.

(Continued)

FOREIGN PATENT DOCUMENTS

WO 2005004500 1/2005
WO 2007117949 10/2007
WO 2010022255 2/2010

OTHER PUBLICATIONS

"DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003), 69 pages.

(Continued)

*Primary Examiner* — Andrew W Chriss
*Assistant Examiner* — Kenan Cehic

(57) ABSTRACT

The present disclosure includes systems and techniques relating to wireless devices. A described technique includes determining wireless resource allocations (e.g., spatial wireless channel allocations, downlink slot assignments, uplink slot assignments, and frequency sub-band assignments that correspond respectively to frequency sub-bands of a frequency band) in a time domain, a spatial wireless channel domain, and a frequency domain to coordinate communications with wireless devices. The technique further includes generating and transmitting information in one or more frames that directs wireless communications based on (Continued)

the wireless resource allocations. The information can be configured to cause the devices to receive respective data in downlink slots via spatial wireless channels in accordance with the wireless resource allocations, and to cause the devices to transmit, concurrently, respective acknowledgement indications, in response to the respective data, in uplink slots in accordance with the wireless resource allocations. The acknowledgement indications can be assigned to different frequency sub-bands.

17 Claims, 15 Drawing Sheets

Related U.S. Application Data

(60) Provisional application No. 61/168,531, filed on Apr. 10, 2009.

(58) Field of Classification Search
USPC .................................................. 370/310–350
See application file for complete search history.

(56) References Cited

U.S. PATENT DOCUMENTS

| | | | |
|---|---|---|---|
| 2006/0153227 A1 | 7/2006 | Hwang et al. | |
| 2007/0153754 A1 | 7/2007 | Shapira et al. | |
| 2007/0211620 A1 | 9/2007 | McBeath et al. | |
| 2007/0230373 A1 | 10/2007 | Li et al. | |
| 2007/0263702 A1* | 11/2007 | Kwon | H04B 1/713 |
| | | | 375/135 |
| 2007/0298742 A1* | 12/2007 | Ketchum | H04B 7/0617 |
| | | | 455/186.1 |
| 2008/0057972 A1* | 3/2008 | Doettling | H04W 72/1289 |
| | | | 455/450 |
| 2008/0212538 A1* | 9/2008 | Molisch | H04B 7/0417 |
| | | | 370/334 |
| 2010/0195586 A1 | 8/2010 | Choi et al. | |
| 2010/0248635 A1 | 9/2010 | Zhang et al. | |
| 2010/0260138 A1 | 10/2010 | Liu et al. | |
| 2011/0038332 A1 | 2/2011 | Liu et al. | |

OTHER PUBLICATIONS

"Part 11: Wireless LAN Medium Access Control (MAC) and Physical Layer (PHY) specifications: High-Speed Physical Layer in the 5 GHz Band," IEEE Std. 802.11a (1999), 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification," IEEE Std. 802.11n (2005), 131 pages.

Information technology—Telecommunications and information exchange between systems—Local and metropolitan networks—specific requirements. Part 11: Wireless LAN Medium Access Control (MAC) and Physical Layer (PHY) Specifications, IEEE Std. 802.11n, Oct. 29, 2009, 535 pages.

International Search Report and Written Opinion for App. Ser. No. PCT/US2010/029275, dated Aug. 12, 2010, 14 pages.

Zhang et al., "Exploiting Multi-Antennas for Opportunistic Spectrum Sharing in Cognitive Radio Networks," IEEE The 18th Annual IEEE International Symposium on Personal, Indoor and Mobile Radio Communications (PIMRC), 2007, 5 pages.

International Search Report and Written Opinion from App. Ser. No. PCT/US2010/030624, dated Jul. 15, 2010, 22 pages.

IEEE P802.11 n™/D2.00, "Part 11: Wireless LAN Medium Access Control (MAC) and Physical Layer (PHY) specifications", Feb. 2007, pp. 1-498.

* cited by examiner

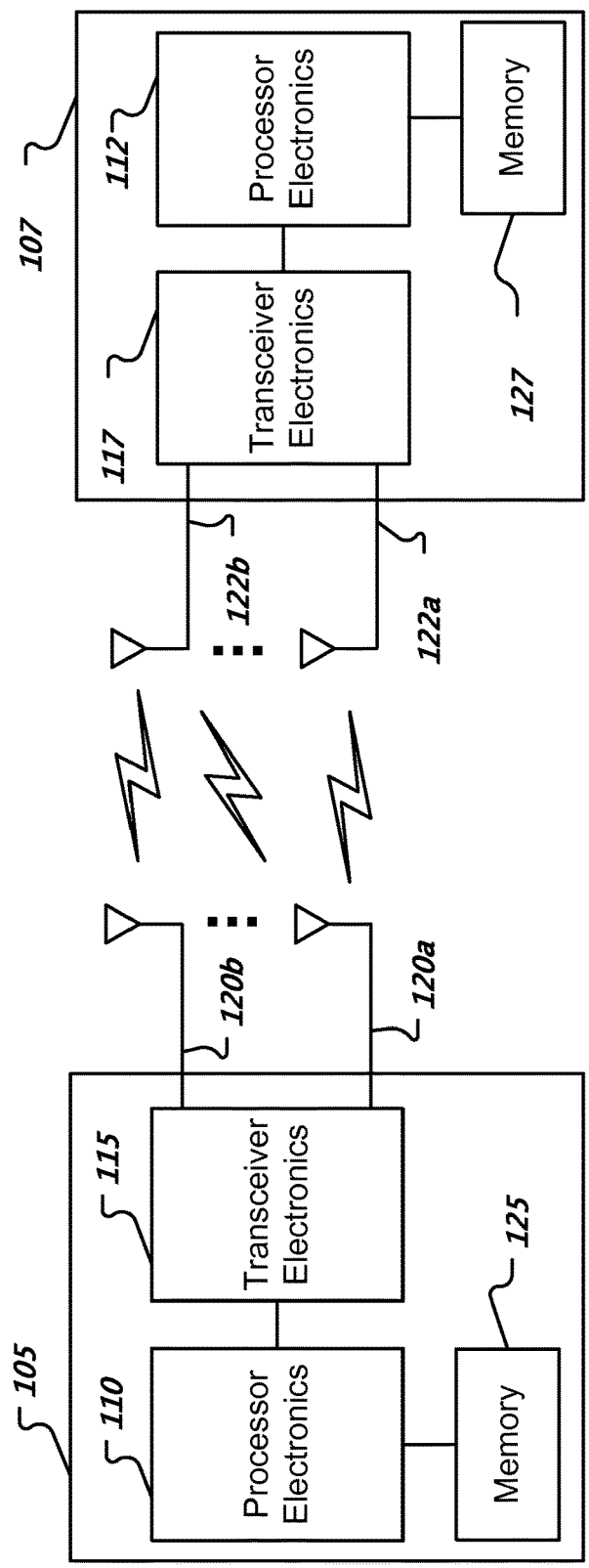

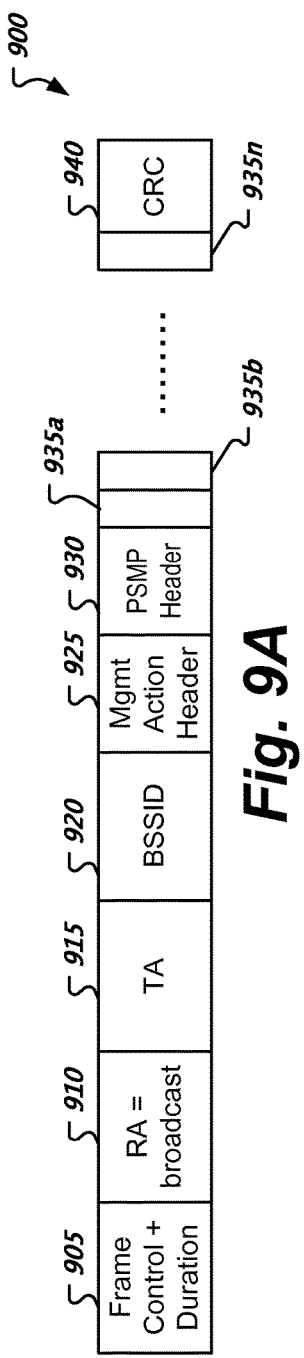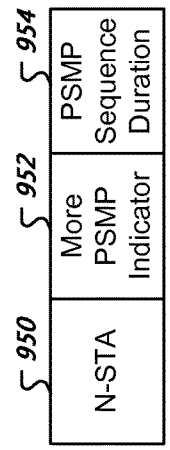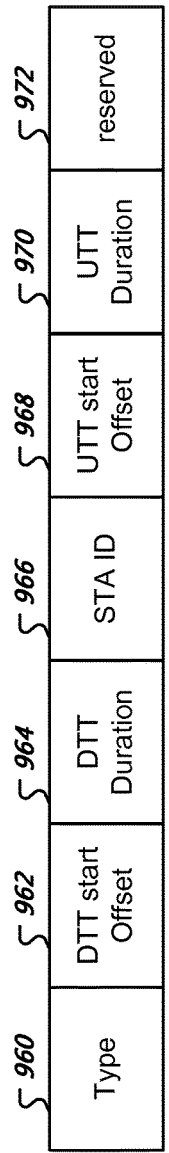
Fig. 9A
Fig. 9B
Fig. 9C

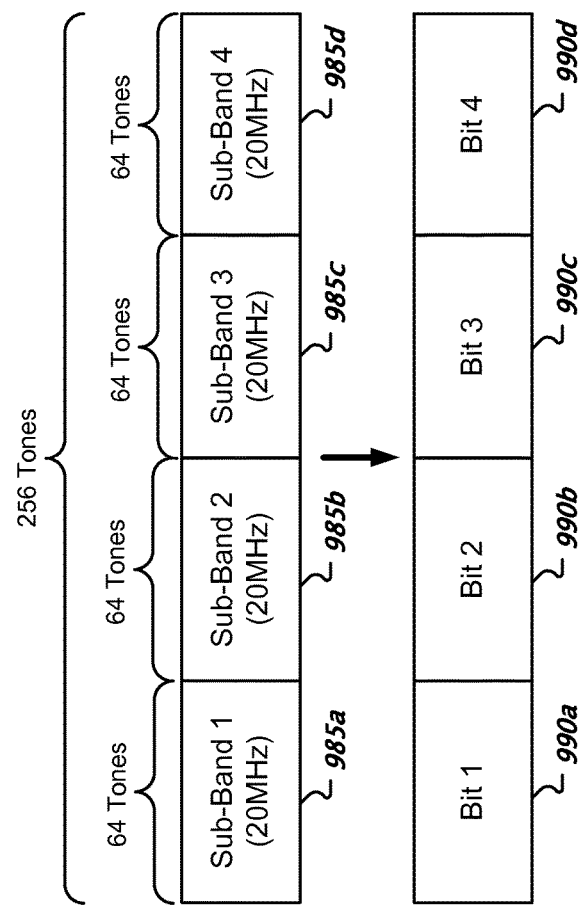

SIGNALING FOR MULTI-DIMENSION WIRELESS RESOURCE ALLOCATION

CROSS REFERENCE TO RELATED APPLICATION

This disclosure is a continuation of and claims the benefit of the priority of U.S. application Ser. No. 12/758,709, filed Apr. 12, 2010 and entitled "Signaling For Multi-Dimension Wireless Resource Allocation", which claims the benefit of the priority of U.S. Provisional Application Ser. No. 61/168,531, filed Apr. 10, 2009 and entitled "Extended PSMP for Advanced Resource Allocation," which is incorporated herein by reference in its entirety.

BACKGROUND

Wireless Local Area Networks (WLANs) include multiple wireless communication devices that communicate over one or more wireless channels. When operating in an infrastructure mode, a wireless communication device called an access point (AP) provides connectivity with a network such as the Internet to other wireless communication devices, e.g., client stations or access terminals (AT). Various examples of wireless communication devices include mobile phones, smart phones, wireless routers, wireless hubs. In some cases, wireless communication electronics are integrated with data processing equipment such as laptops, personal digital assistants, and computers.

Wireless communication systems such as WLANs can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones. Some wireless communication systems use a single-in-single-out (SISO) communication approach, where each wireless communication device uses a single antenna. Other wireless communication systems use a multiple-in-multiple-out (MIMO) communication approach, where a wireless communication device uses multiple transmit antennas and multiple receive antennas. WLANs such as those defined in the Institute of Electrical and Electronics Engineers (IEEE) wireless communications standards, e.g., IEEE 802.11a, IEEE 802.11n, or IEEE 802.11 ac, can use OFDM to transmit and receive signals. Moreover, WLANs, such as ones based on the IEEE 802.11n standard, can use OFDM and MIMO.

SUMMARY

The present disclosure includes systems and techniques for wireless local area networks.

Systems and techniques for wireless local area networks can include determining wireless resource allocations in a time domain, a spatial wireless channel domain, and a frequency domain to coordinate communications with wireless communication devices, generating a control frame that directs wireless communications based on at least a portion of the wireless resource allocations, and transmitting the control frame to the wireless communication devices. Determining wireless resource allocations can include determining frequency allocations in the time domain. Determining wireless resource allocations can include determining spatial wireless channel allocations in the time domain.

Systems and techniques for wireless local area networks can include one or more of the following features. Implementations of systems and techniques can include transmitting a sounding packet in a downlink slot in accordance with the downlink slot assignment, wherein generating the control frame can include including information that describes the downlink slot assignment. Implementations can include receiving feedback packets transmitted by the wireless communication devices in accordance with the uplink slot assignments. In some implementations, feedback packets are derived from wireless channel estimations that are based on received versions of the sounding packet. Implementations can include broadcasting a sounding packet to the wireless communication devices. Implementations can include transmitting information that identifies which ones of the wireless communication devices are required to respond to the sounding packet.

Generating a control frame can include including information to cause a first device to receive first data in a downlink frame via a first spatial wireless channel. Generating a control frame can include including information to cause the first device to transmit an acknowledgement indication related to the first data in a first uplink slot of an uplink frame. Generating a control frame can include including information to cause a second device to receive second data in the downlink frame via a second spatial wireless channel. Generating a control frame can include including information to cause the second device to transmit an acknowledgement indication related to the second data in a second uplink slot of the uplink frame.

Determining the wireless resource allocations can include assigning the first uplink slot to a first frequency sub-band of a frequency band. Determining the wireless resource allocations can include assigning the second uplink slot to a second frequency sub-band of the frequency band. The first sub-band can be different from the second sub-band. The frequency band can include orthogonal frequency division multiplexing (OFDM) tones.

Generating the control frame can include including information regarding two or more records associated with two or more wireless communication devices. A record can cause corresponding devices to receive the sounding packet in the downlink slot.

Determining the wireless resource allocations can include assigning a first downlink slot to a first frequency sub-band of a frequency band. Determining the wireless resource allocations can include assigning a second downlink slot to a second frequency sub-band of the frequency band. The first sub-band can be different from the second sub-band. The frequency band can include orthogonal frequency division multiplexing (OFDM) tones.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiment can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus such as a computer, or combinations of these.

In one aspect, apparatuses and systems can include transceiver electronics to transmit and receive signals and processor electronics. In some implementations, processor electronics are configured to determine wireless resource allocations in a time domain, a spatial wireless channel domain, and a frequency domain to coordinate communications with two or more wireless communication devices, generate a control frame that directs wireless communications based on at least a portion of the wireless resource allocations, and to cause a transmission of the control frame to the wireless communication devices. Wireless resource allocations can include two or more determined frequency allocations in the time domain. Wireless resource allocations can include two or more determined spatial wireless channel allocations in the time domain. A control frame can include a downlink slot assignment and two or more uplink slot assignments. Two or more uplink slot assignments can be associated with two or more wireless communication devices, respectively.

In another aspect, systems can include wireless communication devices such as two or more client stations and an access point. An access point can be configured to determine wireless resource allocations in a time domain, a spatial wireless channel domain, and a frequency domain to coordinate communications with the two or more wireless communication devices, generate a control frame that directs wireless communications based on at least a portion of the wireless resource allocations, and cause a transmission of the control frame to the wireless communication devices.

Details of one or more implementations are set forth in the accompanying drawings and the description below. Other features and advantages may be apparent from the description and drawings, and from the claims.

DRAWING DESCRIPTIONS

FIG. 1B shows an example of a wireless local area network with two wireless communication devices.

FIG. 9A shows an example of an extended power save multi-poll frame.

FIG. 9B shows an example of a power save multi-poll header.

FIG. 9C shows an example of a station record.

FIG. 9D shows an example of a station record that includes a frequency sub-band field.

FIG. 9E shows an example of a mapping between a group of frequency sub-bands and a frequency sub-band field.

Like reference symbols in the various drawings indicate like elements.

DETAILED DESCRIPTION

A wireless communication device can schedule uplink and downlink communications in multiple dimensions including time, frequency, and space. For example, a device such as an access point can assign multiple devices to receive data in one or more downlink slots. The access point can assign multiple devices to transmit data in one or more uplink slots. A slot such as a downlink slot or an uplink slot can be described by a time resource description, e.g., starting time, time offset, or duration, and a frequency resource description, e.g., a frequency range or a frequency subcarrier group identifier. A slot can be further associated with a spatial wireless communication channel. Scheduling in the space domain can include scheduling communications on two or more spatially separated wireless communication channels that are respectively associated with two or more devices.

Figure 1A:
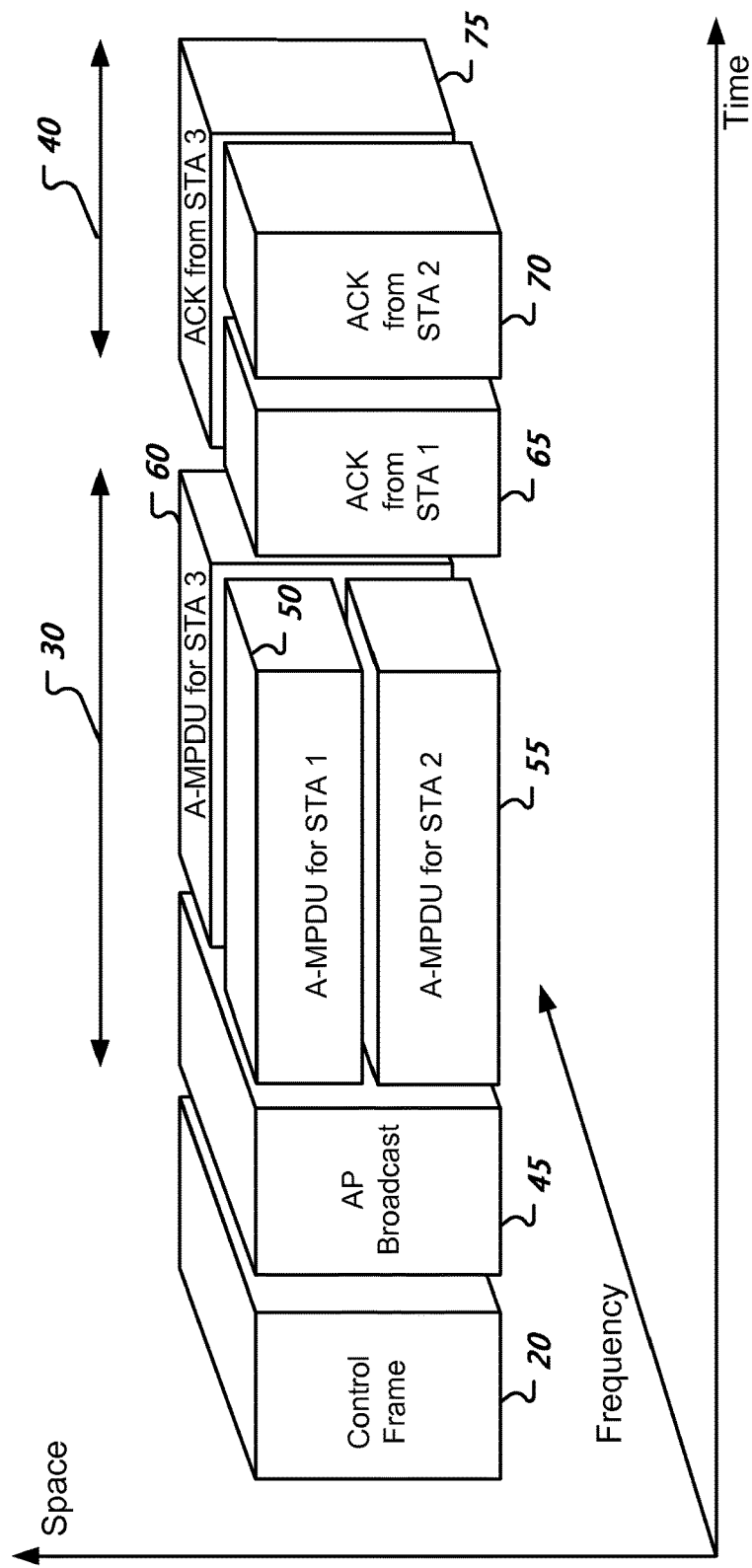
FIG. 1A shows an example of communicating via time, frequency, and spatial domains.

FIG. 1A shows an example of communicating via time, frequency, and space domains. Wireless communication devices can communicate in the time, frequency, and space domains. A device such as an access point sends a control frame 20 that includes schedule information. Schedule information can include indications of resource assignments in the time, frequency, and space domains. A resource assignment can include information that associates an identifier, e.g., a station identifier, multi-station group identifier, or a broadcast identifier, with a downlink resource block 45, 50, 55, 60 in a downlink frame 30. A downlink resource block can include a downlink slot. A resource assignment can include information that associates an identifier with an uplink resource block 65, 70, 75 in an uplink frame 40. An uplink resource block can include an uplink slot. An identifier can include an address of a device. In some implementations, an identifier is a multicast address that is associated with a group of devices. For example, a device (e.g., an access point) can send a resource assignment with a group identifier, such as a group address or a multicast address, to assign multiple devices to the same resource. The identifier can be a broadcast address.

The control frame 20 can include information that informs listening devices of a broadcast period 45 in which an access point broadcasts data to multiple devices. In this example, the downlink frame 30 includes the broadcast period 45 as a type of a downlink resource block.

In the downlink frame 30, an access point transmits a first data unit to a first client device (STA 1) in a first downlink resource block 50. Concurrently, an access point transmits a second data unit to a second client device (STA 2) in a second downlink resource block 55. The access point, in the same downlink frame 30, transmits a third data unit to a third client device (STA 3) in a third downlink resource block 60. The first and second downlink resource blocks 50, 55 are separated by different spatial wireless channels, but are associated with the same frequency range. The third downlink resource block 60 is associated with a frequency range that is different from that of the first and second downlink resource blocks 50, 55.

In response to data received in the downlink frame 30, the first device can send an acknowledgement to the access point in a first uplink resource block 65 and the second device can send an acknowledgement in a second uplink resource block 70. The third device can send an acknowledgement in a third uplink resource block 75. The first and second uplink resource blocks 65, 70 are separated in the time domain, but are transmitted in the same frequency range. The third uplink resource block 75 is associated with a frequency range that is different from that of the first and second uplink resource blocks 65, 70.

This disclosure provides details and examples of techniques and systems for communicating based on multi-dimensional wireless resource allocations. Communicating based on multi-dimensional wireless resource allocations can include transmitting signaling information that describes an allocation of wireless resources in the time, frequency, and space domains. One or more of the described techniques and systems include coordinating downlink and uplink communications in a multi-dimensional manner. One or more of the described techniques and systems include sounding protocols to sound multiple antennas of a wireless communication device. The wireless resource allocation techniques presented herein can be implemented in a variety of wireless communication systems such as ones based on IEEE 802.11n or IEEE 802.11ac.

FIG. 1B shows an example of a wireless local area network with two wireless communication devices. Wireless communication devices 105, 107 such as an access point (AP), base station (BS), access terminal (AT), client station, or mobile station (MS) can include processor electronics 110, 112 such as one or more processors that implement methods effecting the techniques presented in this disclosure. Wireless communication devices 105, 107 include transceiver electronics 115, 117 to send and/or receive wireless signals over one or more antennas 120a, 120b, 122a, 122b. In some implementations, transceiver electronics 115, 117 include multiple radio units. In some implementations, a radio unit includes a baseband unit (BBU) and a radio frequency unit (RFU) to transmit and receive signals. Wireless communication devices 105, 107 include one or more memories 125, 127 configured to store information such as data and/or instructions. In some implementations, wireless communication devices 105, 107 include dedicated circuitry for transmitting and dedicated circuitry for receiving.

A first wireless communication device 105 can transmit data to two or more devices via two or more spatial wireless communication channels such as orthogonal spatial subspaces, e.g., orthogonal Space Division Multiple Access (SDMA) subspaces. For example, the first wireless communication device 105 can concurrently transmit data to a second wireless communication device 107 using a spatial wireless channel and can transmit data to a third wireless communication device (not shown) using a different spatial wireless channel. In some implementations, the first wireless communication device 105 implements a space division technique to transmit data to two or more wireless communication devices using two or more spatial multiplexing matrices to provide spatial separated wireless channels in a single frequency range.

Wireless communication devices 105, 107 in a WLAN can use one or more protocols for medium access control (MAC) and Physical (PHY) layers. For example, a wireless communication device can use a Carrier Sense Multiple Access (CSMA) with Collision Avoidance (CA) based protocol for a MAC layer and OFDM for the PHY layer. A MIMO-based wireless communication device can transmit and receive multiple spatial streams over multiple antennas in each of the tones of an OFDM signal.

Wireless communication devices 105, 107 are sometimes referred to as transmitters and receivers for convenience. For example, a "transmitter" as used herein refers to a wireless communication device that receives and transmits signals. Likewise, a "receiver" as used herein refers to a wireless communication device that receives and transmits signals.

Wireless communication devices such as a MIMO enabled AP can transmit signals for multiple client wireless communication devices at the same time in the same frequency range by applying one or more transmitter side beam forming matrices to spatially separate signals associated with different client wireless communication devices. Based on different interference patterns at the different antennas of the wireless communication devices, each client wireless communication device can discern its own signal. A MIMO enabled AP can participate in sounding to obtain channel state information for each of the client wireless communication devices. The AP can compute spatial multiplexing matrices, such as spatial steering matrices, based on the different channel state information to spatially separate signals to different client wireless communication devices.

A MIMO enabled AP can use frequency multiplexing to communicate with a group of devices. In one or more of the multiplexed frequency ranges, the AP can use spatial multiplexing to communicate with different devices via different spatial wireless channels. For example, an AP uses spatial multiplexing for multiple devices in one frequency sub-band and uses another frequency sub-band for a single device.

A transmitter can use a transmission signal model to generate SDMA transmission signals for two or more receivers. Generating SDMA transmission signals can include using spatial multiplexing matrixes associated with respective receivers. A transmitter can construct a multiplexing matrix W for client receivers based on interference avoidance and/or signal-to-interference and noise ratio (SINR) balancing. Interference avoidance attempts to minimize the amount of non-desired signal energy arriving at a receiver. Interference avoidance can ensure that signals intended for a particular receiver arrive only at that particular receiver and cancel out at a different receiver. A transmitter can perform SINR balancing. SINR balancing can include determining multiplexing matrices to actively control the SINRs observed at different receivers. For example, one SINR balancing approach can include maximizing the minimum SINR across serviced receivers.

A transmitter can simultaneously communicate with multiple receivers via different spatial wireless channels. The transmitter can use multiplexing matrices, such as steering matrices, to transmit information on different spatial wireless channels. The transmitter can multiply a transmission vector for the i-th receiver by a respective multiplexing matrix. The multiplexing matrix for each receiver can differ. A multiplexing matrix can be a function of the wireless channel between the transmitter and the receiver. The transmitter can combine steered signal vectors corresponding to the different receivers to produce transmission signals that simultaneously transmit different information to respective receivers.

In some implementations, a transmitter uses an OFDM transmission signal model based on $$S = \sum_{i=1}^{N} W_i x_i$$

where s is a transmitted signal vector for one tone, N is a number of simultaneously serviced receivers, $x_i$ is an information vector ($T_i \times 1$, $T_i < P_i$) intended for the i-th receiver, $W_i$ is a multiplexing matrix ($M \times T_i$) for the i-th receiver, M is a number of transmit antennas of the transmitter, and $P_i$ is the number of receive antennas of the i-th receiver.

In some implementations, a wireless communication device can determine multiple wireless channel matrices $H_k^i$ based on one or more received signals. Here, $H_k^i$ represents the channel conditions for the k-th tone associated with the i-th receiver. A transmitter can transmit on multiple tones to two or more receivers. For example, the first tone received by the first receiver can be expressed as $H_1^1[W_1^1 x_1 + W_1^2 x_2 + \ldots + W_1^N x_S]$, where $W_k^i$ is the multiplexing matrix for the i-th receiver at the k-th tone.

A multiplexing matrix W can be selected to cause the first receiver to receive $H_1^1 W_1^1 x_1$ and to have the remaining signals $x_2, x_3, \ldots, x_S$ be in a null space for the first receiver. Therefore, when using a signal interference approach, the values of the multiplexing matrix W are selected such that $H_1^1 W_1^2 \approx 0, \ldots, H_1^1 W_1^N \approx 0$. In other words, the multiplexing matrix W can adjust phases and amplitudes for these OFDM tones such that a null is created at the first receiver. That way, the first receiver can receive the intended signal $x_1$ without interference from other signals $x_2, x_3, \ldots, x_S$ intended for the other receivers.

In general, a received signal can include a signal component intended for i-th receiver and one or more co-channel interference components from one or more signals intended for one or more other receivers. For example, a received signal at the i-th receiver is expressed by:

$$y_i = H_i W_i x_i + H_i \sum_{j \neq i} W_j x_j + n_i$$

where $H_i$ represents a wireless channel matrix associated with a wireless channel between the transmitter and the i-th receiver, and $n_i$ represents noise at the i-th receiver. The summation is over values of j corresponding to receivers other than the i-th receiver.

When servicing multiple receivers simultaneously, power available at a transmitter can be allocated across multiple receivers. This, in turn, affects the SINR observed at each of the receivers. The transmitter can perform flexible power management across the receivers. For example, a receiver with low data rate requirements can be allocated less power by the transmitter. In some implementations, transmit power is allocated to receivers that have high probability of reliable reception (so as not to waste transmit power). Power can be adjusted in the corresponding multiplexing matrix W and/or after using other amplitude adjustment methods.

A transmitter device can determine a multiplexing matrix W associated with a receiver based on channel conditions between the transmitter and the receiver. The transmitter and the receiver can perform sounding to determine wireless channel characteristics. Various examples of sounding techniques include explicit sounding and implicit sounding.

In some implementations, a device can transmit sounding packets based on pre-determined sounding data and spatial mapping matrix $Q_{sounding}$. For example, a device can multiply $Q_{sounding}$ with a sounding data transmit vector. In some implementations, in the case of multiple soundings, $Q_{sounding}$ is a column wise, composite matrix. A device can determine a steering matrix $V_i$ based on information of how a sounding packet was received, e.g., comparing a signal indicative of a received sounding packet with a pre-determined signal. In some implementations, an AP computes a steering matrix for the i-th receiver based on $W_i = Q_{sounding} V_i$.

In some implementations, an AP transmits a sounding packet to a receiver. A receiver can determine wireless channel information based on the sounding packet. In some implementations, the receiver sends wireless channel information such as channel state information (CSI), information indicative of a steering matrix $V_i$, or information indicative of interference. For example, a receiver can measure CSI based on the received sounding packet.

An AP can compute steering matrices based on wireless channel information. In some implementations, a device computes:

$$H_{Total} = \begin{bmatrix} \tilde{H}_1 \\ \tilde{H}_2 \end{bmatrix} \approx \begin{bmatrix} H_1 \\ H_2 \end{bmatrix} Q_{sounding}$$

as the composed CSI feedback from two receivers. Here, $\tilde{H}_1 \approx H_1 Q_{sounding}$, $\tilde{H}_2 \approx H_2 Q_{sounding}$ are the estimations of the wireless channel matrices associated with tones of an OFDM system for the two clients respectively. $H_{Total}$ can be expanded to include wireless channel matrix estimates for additional clients.

A multiplexing matrix such as a steering matrix can include an interference mitigation component and a beam forming component. Let $V_{i\perp}$ represent the interference mitigation of the i-th client's signal at the other clients. In some implementations, $V_{i\perp}$ are matrices that map to the null spaces of a matrix composed by the rows in $H_{Total}$ corresponding to the channels, except the channel of the i-th client (e.g., except for $\tilde{H}_i$). In other words, $V_{i\perp} = null(\tilde{H}_{\bar{i}})$ and $\tilde{H}_{\bar{i}} V_{i\perp} \approx 0$. Let $V_i'$ represent the beam forming matrix specific for the i-th client. In some implementations, $V_i'$ is the per-client steering matrix for improving the performance of the equivalent channel, $\tilde{H}_i V_{\bar{i}\perp}$. In some implementations, a beam forming gain matrix such as $V_i'$ is computed via a singular value decomposition (SVD) technique. In some implementations, a steering matrix is given by $V_i = V_{\bar{i}\perp} V_i'$.

In a two client example, an AP can compute steering matrices for the clients based on $V_1 = V_{\bar{1}\perp} V_1'$ and $V_2 = V_{\bar{2}\perp} V_2'$, respectively. The AP can compute $V_{\bar{1}\perp} = \text{null}(\tilde{H}_2)$ for the first client and $V_{\bar{2}\perp} = \text{null}(\tilde{H}_1)$ for the second client. Observe, that $\tilde{H}_2 V_{\bar{1}\perp} \approx 0$, $\tilde{H}_1 V_{\bar{2}\perp} \approx 0$.

In a three client example, an AP can compute steering matrices for the clients based on $V_1 = V_{\bar{1}\perp} V_1'$, $V_2 = V_{\bar{2}\perp} V_2'$, and $V_3 = V_{\bar{3}\perp} V_3'$, respectively. The AP can compute $V_{\bar{1}\perp} = \text{null}([\tilde{H}_2, \tilde{H}_3])$ for the first client. The AP can compute $V_{\bar{2}\perp} = \text{null}([\tilde{H}_1, \tilde{H}_3])$ for the second client. The AP can compute $V_{\bar{3}\perp} = \text{null}([\tilde{H}_1, \tilde{H}_2])$ for the third client. Observe, that $\tilde{H}_2 V_{\bar{1}\perp} \approx 0, \tilde{H}_1 V_{\bar{2}\perp} \approx 0, \tilde{H}_3 V_{\bar{3}\perp} \approx 0$.

In some implementations, clients can determine steering matrix feedback based on wireless channel estimations performed at each client based on receiving a sounding packet from an AP. Steering matrix feedback can include a matrix. In some implementations, steering matrix feedback includes a compressed representation of a matrix. Various examples of steering feedbacks include beam forming feedback and interference rejection feedback. Based on receiving steering matrix feedback, an AP can compute an updated steering matrix $W_i$ for each client. In some implementations, some clients in a WLAN can transmit beam forming feedback, while other clients in the WLAN can transmit interference rejection feedback.

An AP can receive beam forming feedback from a client. Such feedback can include a beam forming feedback matrix $V_{i\_FB}$ from the i-th client for beam forming gain based on the wireless channel from the AP to the i-th client. A client can compute:

$$V_{i\_FB} f_{BF}(\tilde{H}_i),$$

where $f_{BF}$ is a beam forming function. A beam forming computation can include performing a SVD computation. The AP can compute a steering matrix for the i-th client based on:

$$W_i = Q_{sounding} V_{i\_FB}.$$

In some implementations, beam forming feedback includes a signal-to-noise-ratio (SNR) value of each spatial stream that corresponds to each column of a steering matrix feedback. In some implementations, beam forming feedback includes information associated with a Modulation Coding Scheme (MCS).

An AP can receive interference rejection feedback from a client. A client can send a feedback matrix based on a null space of an estimated wireless channel matrix, e.g., $V_{i\_FB} = \text{null}(\tilde{H}_i)$. The AP can use the feedback matrix from the i-th client for interference avoidance of the signal of the other clients to the i-th client.

In a two client example, $V_{1\_FB} = \text{null}(\tilde{H}_1)$ and $V_{2\_FB} = \text{null}(\tilde{H}_2)$. The AP can compute steering matrices for the clients based on the $V_{i\_FB}$ matrices, e.g., $W_1 = Q_{sounding} V_{2\_FB}$ and $W_2 = Q_{sounding} V_{1\_FB}$. In some cases, $V_{1\_FB}$ may map to a subspace of the space $\text{null}(\tilde{H}_1)$, e.g., less number of columns than $\text{null}(\tilde{H}_1)$. In some implementations, the number of space time streams for the second client is less than or equal to the number of columns in $V_{1\_FB}$. Likewise, the number of space time streams for the first client is less than or equal to the number of columns in $V_{2\_FB}$.

A client can receive a physical layer packet with $N_{sts\_client}$ space time streams, e.g., streams based on MCS. To feedback an interference rejection steering matrix, the client can compute a feedback steering matrix where the number of columns is equal to or less than $N_{sts\_max\_AP} - N_{sts\_client}$, where $N_{sts\_max\_AP}$ is the maximum possible number of space-time streams that can be transmitted from the AP. In some implementations, a client can feedback a MCS suggestion together with the interference rejection steering matrix feedback. A MCS suggestion can indicate a $N_{sts\_client}$ value that is preferred by the client.

In some implementations, a client can feedback a SNR of each receive chain. In some implementations, a client can feedback a sub-stream SNR for $N_{sts\_client}$ sub-streams. In some implementations, $N_{sts\_client} = N_{sts\_max\_AP} - \text{Columns}(V_{i\_FB})$, where Columns $(V_{i\_FB})$ represents the number of columns of $V_{i\_FB}$.

In some implementations, an AP can perform one or more MAC information element (IE) exchanges when establishing a SDMA protected time period, e.g., TxOP, so that each client knows the maximum possible $N_{sts\_client}$ for the other clients. A client can determine the number of columns in the client's feedback $V_{i\_FB}$ based on the exchanges.

In some implementations, an AP sends sounding request packets to clients that cause the clients to send sounding packets from which the AP can estimate wireless channel information. The AP can compute wireless channel matrices $\tilde{H}_i^T$ for the wireless channels between the clients and the AP. In some implementations, a $H_{Total}$ matrix can include two or more $\tilde{H}_i^T$ matrices. The AP can compute the steering matrices $V_i$ based on the $H_{Total}$ matrix.

Figure 1C:
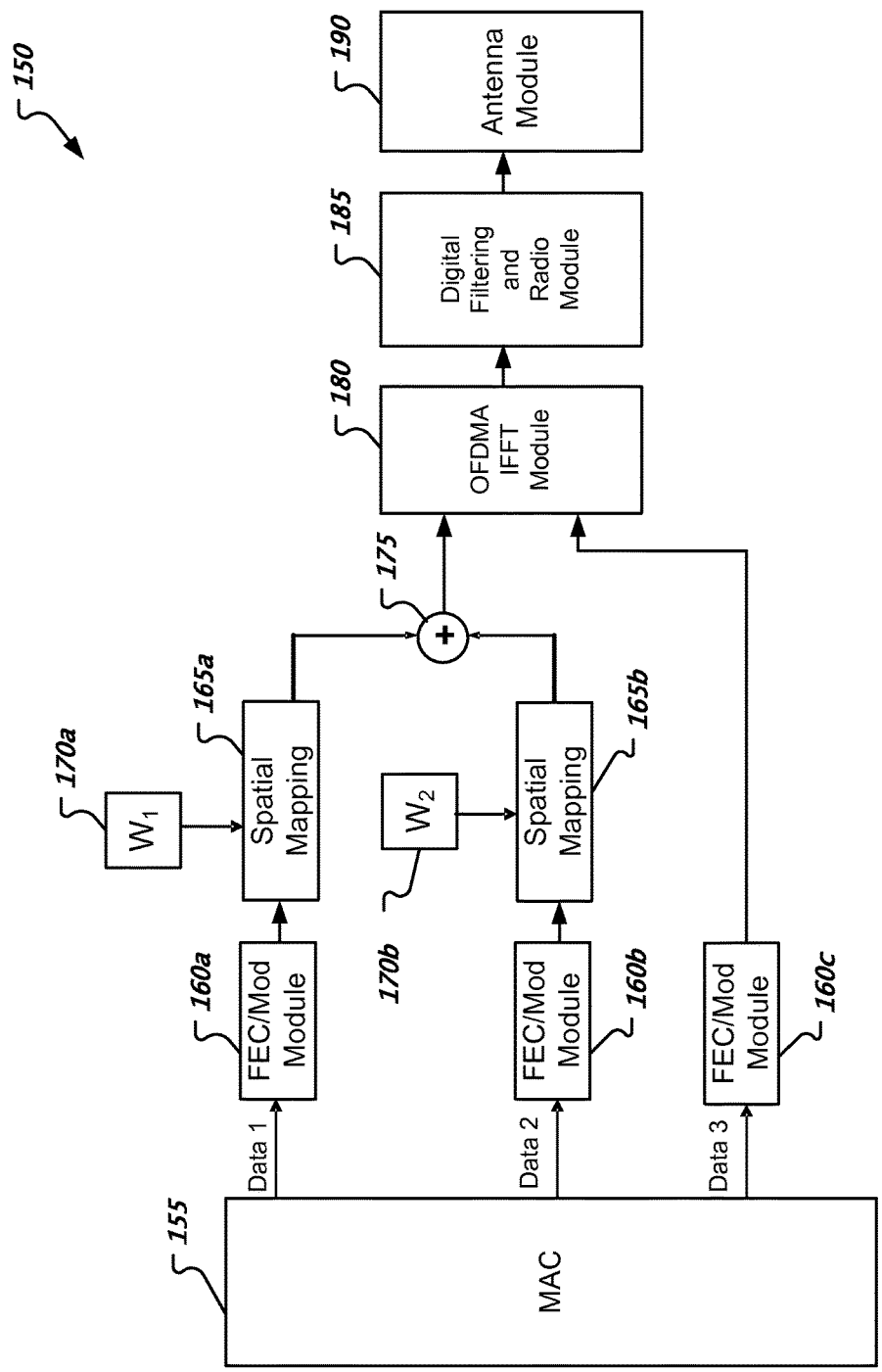
FIG. 1C shows an example of a wireless communication device architecture.

FIG. 1C shows an example of a wireless communication device architecture, which can include the various implementation details described above. A wireless communication device 150 can produce signals for different clients that are spatially separated by respective multiplexing matrices $W_i$, e.g., steering matrices, that are associated with a first frequency range and can produce signals for one or more clients that are associated with a second frequency range. A frequency range can include a group of OFDM sub-carriers.

For spatial multiplexing, each $W_i$ is associated with a subspace. A wireless communication device 150 includes a MAC module 155. The MAC module 155 can include one or more MAC control units (MCUs) (not shown). The wireless communication device 150 includes three or more modules 160a, 160b, 160c that receive data streams, from the MAC module 155, which are associated with different clients. The modules 160a, 160b, 160c can perform encoding, such as a forward error correction (FEC) encoding technique, and modulation on a data stream. First and second modules 160a, 160b are respectively coupled with first and second spatial mapping modules 165a, 165b that are associated with a first frequency range. A third module 160c is associated with a second frequency range. Such a module 160c can bypass spatial mapping for non-SDMA based communications.

The spatial mapping modules 165a, 165b can access a memory 170a, 170b to retrieve a spatial multiplexing matrix associated with a data stream's intended client. In some implementations, the spatial mapping modules 165a, 165b access the same memory, but at different offsets to retrieve different matrices. An adder 175 can sum outputs from the spatial mapping modules 165a, 165b.

An Orthogonal Frequency-Division Multiple Access (OFDMA) Inverse Fast Fourier Transform (IFFT) module 180 can perform IFFTs on one or more data streams associated with one or more groups of OFDM subcarriers, respectively. In some implementations, the module 180 can include an OFDMA module and an IFFT module, where the OFDMA module maps different streams to different subcarrier groups before IFFT processing.

In some implementations, the OFDMA IFFT module 180 can perform an IFFT on an output of the adder 175 to produce a first time domain signal associated with a first frequency range. The IFFT module 180 can perform an IFFT on an output of a FEC/Modulation module 160c to produce a second time domain signal associated with a second frequency range. In some implementations, the IFFT module 180 can combine the frequency components, e.g., first frequency range components, associated with the output of the adder 175 and the frequency components, e.g., second frequency range components, associated with the output of the FEC/modulation module 160c. The IFFT module 180 can perform an IFFT on the combination to produce a time domain signal associated with both frequency ranges. In some implementations, an IFFT module 180 is configured to use one or more FFT bandwidth frequencies, e.g., 20 MHz, 40 MHz, or 80 MHz. In some implementations, the IFFT module 180 can perform different IFFTs.

A digital filtering and radio module 185 can filter the time domain signal and amplify the signal for transmission via an antenna module 190. An antenna module 190 can include multiple transmit antennas and multiple receive antennas. In some implementations, an antenna module 190 is a detachable unit that is external to a wireless communication device 150.

In some implementations, a wireless communication device 150 includes one or more integrated circuits (ICs). In some implementations, a MAC module 155 includes one or more ICs. In some implementations, a wireless communication device 150 includes an IC that implements the functionality of multiple units and/or modules such as a MAC module, MCU, BBU, or RFU. In some implementations, a wireless communication device 150 includes a host processor that provides a data stream to a MAC module 155 for transmission. In some implementations, a wireless communication device 150 includes a host processor that receives a data stream from the MAC module 155. In some implementations, a host processor includes a MAC module 155.

Figure 2:
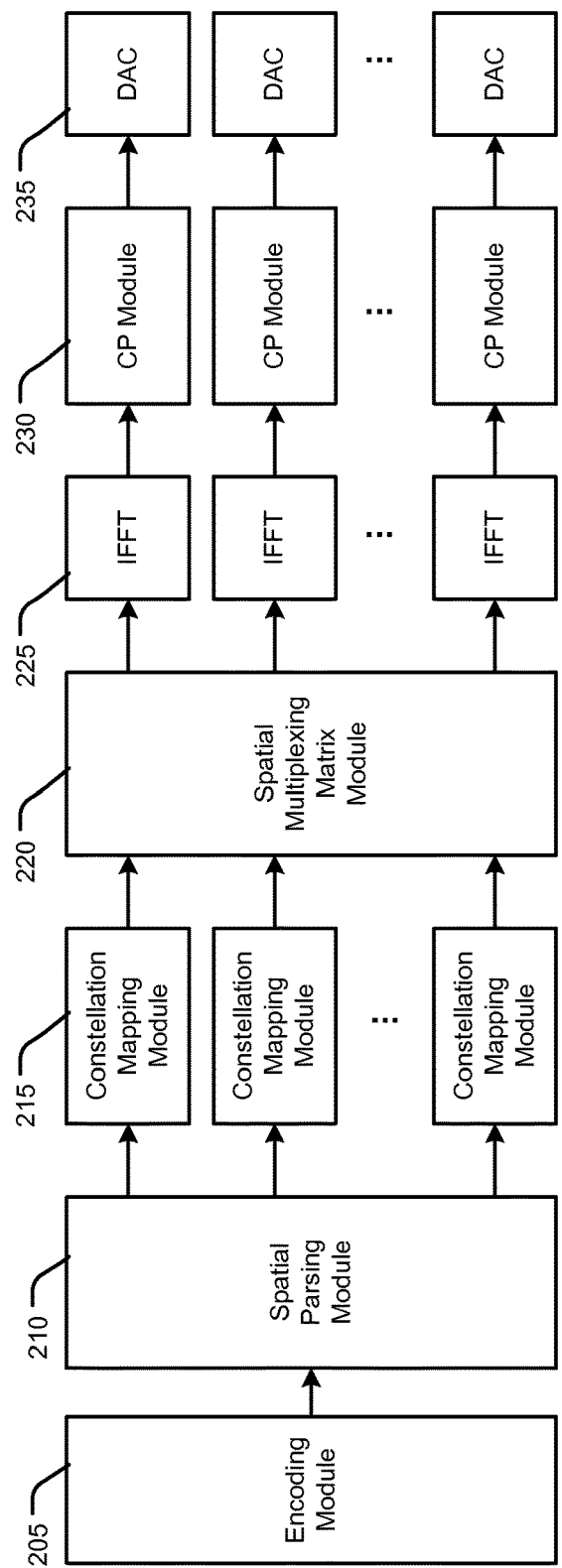
FIG. 2 shows an example of a functional block diagram of a transmit path of a wireless communication device.

FIG. 2 shows an example of a functional block diagram of a transmit path of wireless communication device. In this example, a transmit path is configured for MIMO communications. A wireless communication device such as an AP can include one or more transmit paths. An AP's transmit path can include an encoding module 205 configured to receive a data steam, such as an audio data stream, a video data stream, or combination thereof. The encoding module 205 outputs encoded bit streams to a spatial parsing module 210, which performs spatial mapping to produce multiple outputs.

Outputs of the spatial parsing module 210 are input into constellation mapping modules 215, respectively. In some implementations, a constellation mapping module 215 includes a serial-to-parallel converter that converts an incoming serial stream to multiple parallel streams. The constellation mapping module 215 can perform quadrature amplitude modulation (QAM) on multiple streams produced by a serial-to-parallel conversion. The constellation mapping module 215 can output OFDM tones that are input to a spatial multiplexing matrix module 220. The spatial multiplexing matrix module 220 can multiply the OFDM tones by a spatial multiplexing matrix to produce signal data for multiple transmit antennas.

Outputs of the spatial multiplexing matrix module 220 are input to IFFT modules 225. In some implementations, an IFFT module 225 can include an multiple access module to map different streams to different subcarrier groups. Outputs of the IFFT modules 225 are input to cyclic prefix (CP) modules 230. Outputs of the CP modules 230 are input to digital-to-analog converters (DACs) 235, which produce analog signals for transmission on multiple transmit antennas, respectively.

Figure 3:
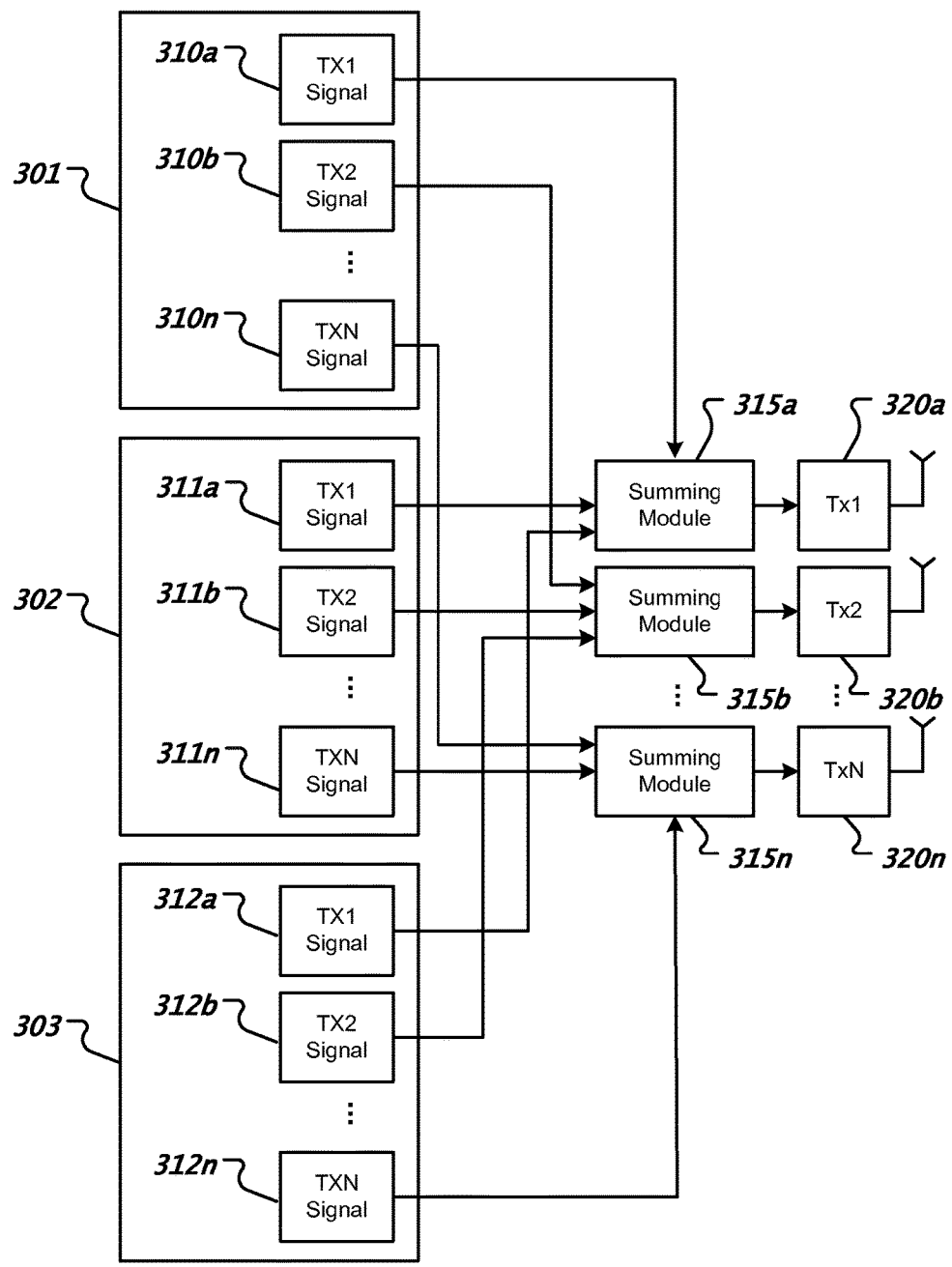
FIG. 3 shows an example of an architecture that combines multiple transmission signals for transmission on multiple antennas.

FIG. 3 shows an example of an architecture that combines multiple transmission signals for transmission on multiple antennas. A transmitter can include two or more transmit paths 301, 302, 303 that are each configured for MIMO communications. A first transmit path 301 generates multiple transmit signals 310a, 310b, 310n for transmission on multiple transmit antennas 320a, 320b, 320n, respectively. A second transmit path 302 generates multiple transmit signals 311a, 311b, 311n for transmission on multiple transmit antennas 320a, 320b, 320n, respectively. A third transmit path 303 generates multiple transmit signals 312a, 312b, 312n, for transmission on multiple transmit antennas 320a, 320b, 320n, respectively.

A transmitter can include multiple summing modules 315a, 315b, 315n that are associated with multiple transmit antennas 320a, 320b, 320n, respectively. In some implementations, summing modules 315a, 315b, 315n sum corresponding outputs of DACs in each of the transmit paths 301, 302, 303 to produce combined transmit signals for each of antennas 320a, 320b, 320n.

A SDMA based device, such as an SDMA enabled access point, can support both single client and multi-client communications. For example, a wireless communication device based on a wireless standard such as IEEE 802.11n can perform legacy mode communications with a single wireless communication device in one window. Such a device can perform multi-client communications in a different window. For example, a transmitter can transmit signaling information that causes legacy devices to ignore processing a multi-client SDMA frame and to prevent a legacy device from transmitting during a transmission of a multi-client SDMA frame. A multi-client SDMA frame can include data for different clients in respective spatial wireless channels.

In some implementations, SDMA based devices are operated to be compatible with legacy devices such as legacy IEEE 802.11n based devices or legacy IEEE 802.11a based devices. In some implementations, a SDMA frame format is compatible with such legacy devices. For example, a legacy device can detect and/or disregard a SDMA frame transmitted in the legacy device's operating frequency band. In some implementations, SDMA devices can create a protected time period (TxOP) during which SDMA frame transmissions are conducted. Such SDMA devices can use a MAC mechanism to reserve time for transmission of SDMA frames.

Figure 4:
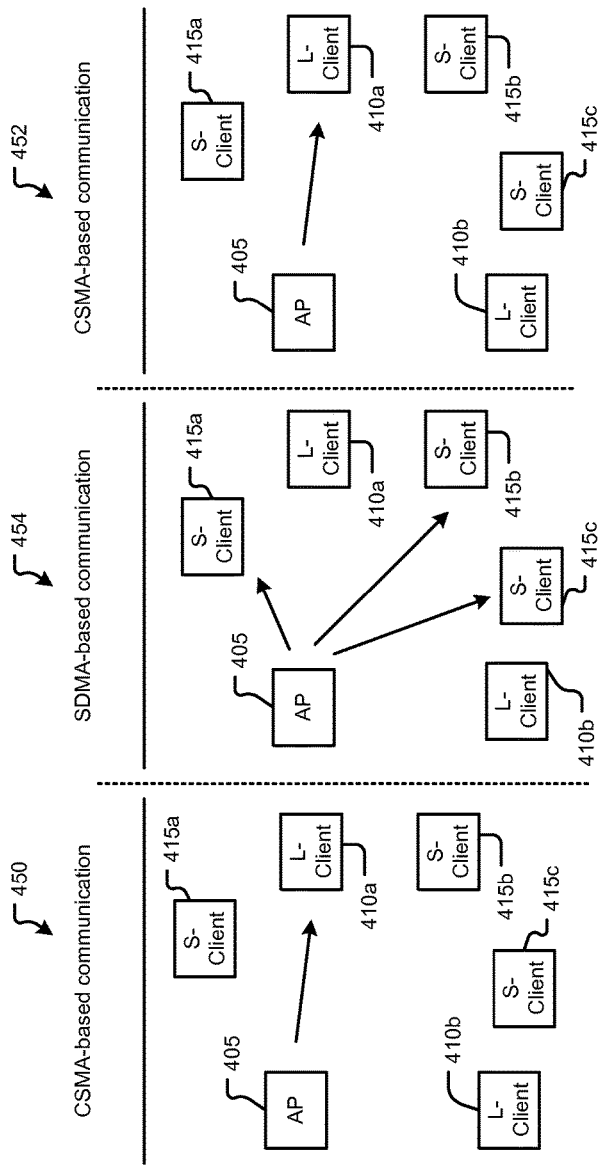
FIG. 4 shows an example of a timing diagram that includes windows for carrier sense based communications and a window for space division based communications.

FIG. 4 shows an example of a timing diagram that includes windows for carrier sense based communications and a window for space division based communications. An AP 405 can transmit or receive data to/from legacy clients 410a, 410b during legacy windows 450, 452 for CSMA-based communications. During a window 454 for SDMA based communications, the AP 405 sends steered data to SDMA enabled clients 415a, 415b, 415c and then receives acknowledgements from the SDMA enabled clients 415a, 415b, 415c. During the SDMA window 454, legacy clients 410a, 410b can be prohibited from transmitting data. Time sufficient for the SDMA window 454 can be arranged with the legacy client stations 410a, 410b using a MAC mechanism. In some implementations, once an AP obtains a transmission opportunity by using CSMA/CA, the AP can choose to transmit a SDMA frame or a non-SDMA frame.

Acknowledgement (ACK) packets can be transmitted by client SDMA devices to acknowledge correctly received frames, e.g., either SDMA or non-SDMA frames, from the AP. In some cases, a negative ACK (NAK) can be transmitted to indicate a failure. If an ACK is required for a non-SDMA frame, the receiving device can send an ACK after a Short Inter-Frame Space (SIFS), which starts after the end of a SDMA frame. In some implementations, a wireless communication device aggregates several acknowledgements and transmits a block ACK based on a block ACK request from the AP.

Figure 5:
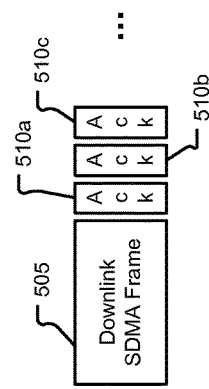
FIG. 5 shows an example of a timing diagram including a downlink space division multiple access frame and uplink acknowledgments.

FIG. 5 shows an example of a timing diagram including a downlink SDMA frame and uplink acknowledgments. An AP can transmit data to different clients in a downlink frame. A downlink frame can include a SDMA frame 505. ACKs 510a, 510b, 510c can be transmitted after the SDMA frame 505 based on a fixed schedule. The AP can send a control frame that includes the fixed schedule. In some implementations, a SDMA frame 505 can include a field or IE in a header, e.g., a PHY header or a MAC header, in each of the signals transmitted in the corresponding subspaces to indicate the ordering of when each client can send an ACK or NAK. However, the allocation of time for ACKs can be distributed using other approaches and/or at other times. A SIFS can separate the SDMA frame 505 and the ACKs 510a, 510b, 510c. SIFS are interspersed between the ACKs 510a, 510b, 510c. In some implementations, the ACKs 510a, 510b, 510c are transmitted in the same time period over different frequency sub-bands. In some implementations, a downlink frame can include a SDMA downlink frame and a non-SDMA downlink frame that are multiplexed by different groups of OFDM tones.

Wireless communication devices can participate in a sounding procedure to determine wireless channel characteristics, and consequently, parameters for SDMA based communications. A sounding procedure can include transmitting sounding packets to sound one or more antennas. A sounding procedure, such as explicit sounding, can include operating an AP to transmit sounding packets to client devices. A sounding procedure, such as implicit sounding, can include operating an AP to cause client devices to transmit sounding packets to the AP. Various examples of sounding packets include staggered sounding packets and null data packets (NDPs). In some implementations, a MAC frame format for a sounding packet can include a field such as a High Throughput (HT) control field or a Very High Throughput (VHT) control field to signal parameters for a sounding procedure, e.g., feedback type.

Figure 6:
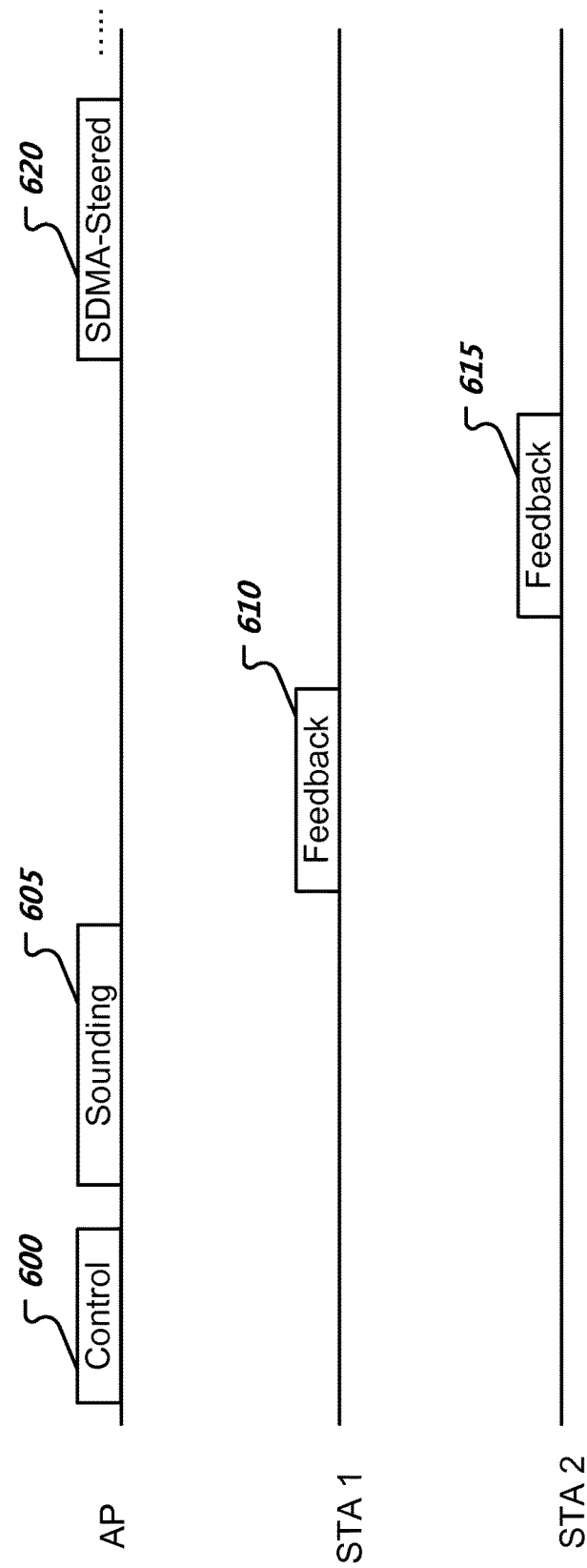
FIG. 6 shows an example of an explicit sounding timing diagram.

FIG. 6 shows an example of an explicit sounding timing diagram. An AP can transmit a control frame 600 such as a Power Save Multi-Poll (PSMP) frame. A control frame 600 can include scheduling information such as downlink and uplink communication resource assignments. In some implementations, devices can use the scheduling information to determine when to transmit and receive and when to sleep to save power.

An AP transmits a sounding packet 605 to two or more receivers in a downlink slot, e.g., STA1 and STA2. In some implementations, an AP can use multicast to transmit a sounding packet to multiple receivers. In some implementations, a sounding packet includes information to coordinate the timing of when receivers send feedback packets. For example, MAC layer data can indicate an ordering of the feedback packets. In some implementations, a control frame 600 includes information to coordinate the timing of when receivers send feedback packets.

Receivers can determine wireless channel information based on a received version of the sounding packet 605. For example, a first receiver transmits a feedback packet 610 to the AP based on the first receiver's reception of the sounding packet 605. The first receiver can use an uplink slot for the feedback packet 610 based on scheduling information in the control frame 600. A second receiver transmits a feedback packet 615 to the AP based on the second receiver's reception of the sounding packet 605. The second receiver can use an uplink slot for the feedback packet 615 based on scheduling information in the control frame 600. The AP can create one or more protected time periods (TxOPs) in which to send and receive sounding and feedback information.

In some implementations, a feedback packet includes channel state information (CSI). In some implementations, a feedback packet includes beam forming feedback information such as a steering matrix. In some implementations, a feedback packet includes interference feedback information such as an interference feedback matrix. Data that comprise a matrix can be compressed for transmission.

The AP can determine steering matrices for the receivers based on the feedback packets. In some implementations, a feedback packet can include wireless channel information. AP transmits a SDMA frame 620 that includes steered data packets for respective receivers.

A wireless communication device can use an implicit sounding procedure to sound antennas. In this example, a transmitter solicits sounding packets from two or more receivers. A transmitter transmits one or more sounding request packets to multiple wireless communication devices. A sounding request packet can cause a receiver to transmit a sounding packet. A sounding request packet can include different segments addressed to different receivers. In some implementations, a transmitter can multicast a sounding request packet to multiple clients. In some implementations, a transmitter can generate an aggregated data unit, e.g., A-MPDU, that includes a data unit for each client in the WLAN. For example, an aggregated data unit can include a first data unit with a sounding request for a first client and a second data unit with a sounding request for a second client. In some implementations, a transmitter transmits separate sounding request packets for each of the receivers.

A transmitter can receive sounding packets from the wireless communication devices. In some implementations, the received sounding packets can be sent in the same TxOP as the sounding request packet. In some implementations, a device can create a TxOP to transmit a sounding packet. The transmitter can estimate wireless channel matrices based on the sounding packets. The transmitter can determine steering matrices based on the wireless channel matrices. The transmitter generates steered data packets based on the steering matrices and data streams. The transmitter can transmit the steered data packets to the wireless communication devices. In some implementations, the transmitter performs calibration for phase shifts and/or amplitudes changes in one or more wireless channels.

In some implementations, a transmitter sends an A-MPDU with a sounding request to each device that is participating in a sounding procedure. Each device can send sounding frames in one or more assigned uplink slots. In some implementations, a transmitter sends one A-MPDU with a sounding request to a multicast address that is associated with multiple devices. In some implementations, a station record can include a field to indicate a request of the device to send sounding frames during one or more assigned uplink slots. In some implementations, a sounding request includes a Training Request (TRQ) field set to indicate that a receiver should send sounding packets.

Figure 7:
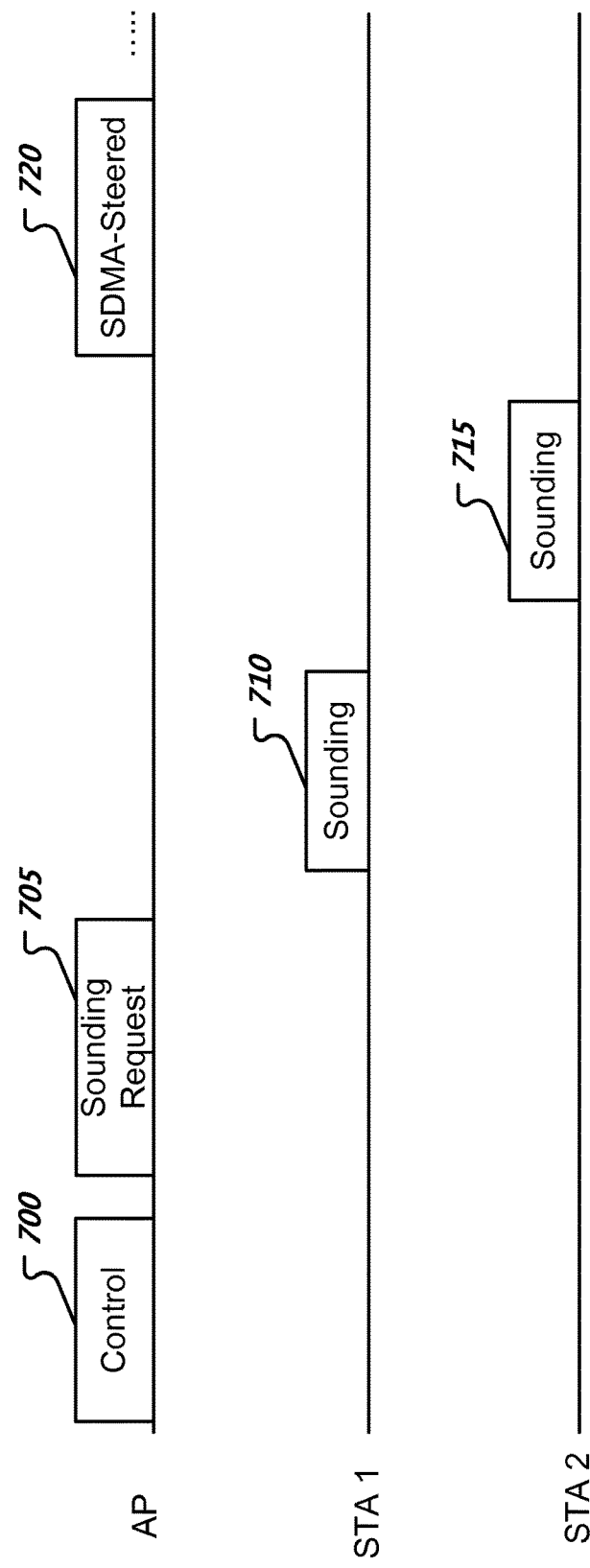
FIG. 7 shows an example of an implicit sounding timing diagram.

FIG. 7 shows an example of an implicit sounding timing diagram. An AP can transmit a control frame 700. A control frame 700 can include scheduling information to assign downlink and uplink communication resources. An AP transmits a sounding request packet 705 to two or more receivers. A sounding request packet 705 can include a TRQ field. The TRQ field is set to one to indicate that one or more sounding packets are requested from a receiver. In some implementations, an AP can use multicast to transmit a sounding request packet to multiple client devices. In some implementations, a sounding request packet includes information to coordinate the timing of when client devices send sounding packets. For example, MAC layer data can indicate an ordering of the sounding packets.

A first client device transmits a sounding packet 710 to the AP. In a subsequent uplink slot, a second client device transmits a sounding packet 715 to the AP. The AP receives the sounding packets. The AP can determine wireless channel information based on the received version of the sounding packets and pre-determined sound packet data. The AP can determine steering matrices for the client devices based on the wireless channel information. The AP transmits a SDMA frame 720 that includes steered data packets for respective client devices.

The AP can determine wireless channel information based on the received version of the sounding packets and pre-determined sound packet data. The AP can determine steering matrices for the client devices based on the wireless channel information. The AP transmits a SDMA frame 720 that includes steered data packets for respective client devices.

Figure 8:
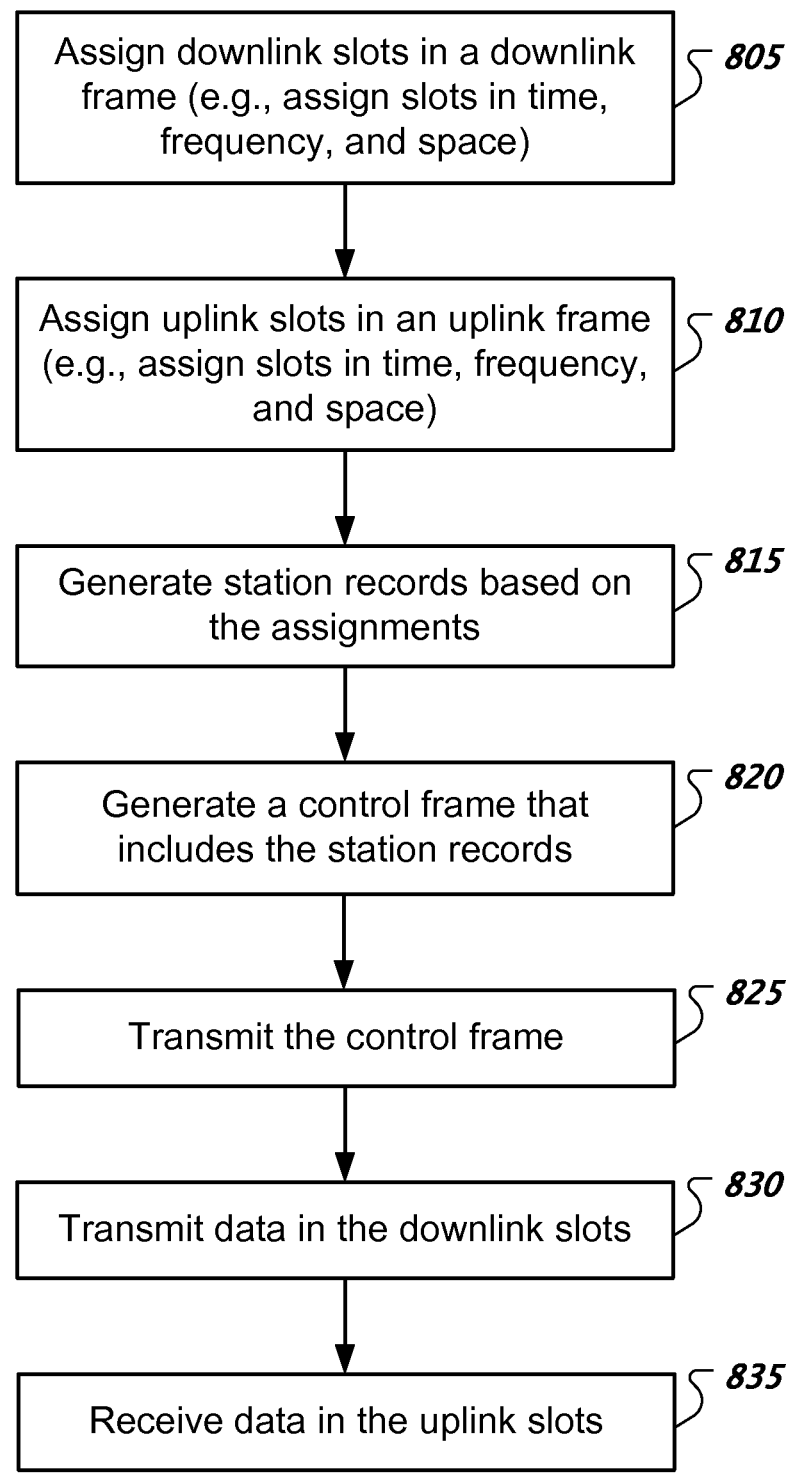
FIG. 8 shows an example of a communication process that schedules communications in the time, frequency, and space domains.

FIG. 8 shows an example of a communication process that schedules communications in the time, frequency, and space domains. At 805, a communication process assigns downlink slots in a downlink frame. The communication process can assign downlink slots in the time domain, frequency domain, and space domain. A space domain can include spatial wireless communication channels. Downlink slots that are assigned to different devices can overlap in the time domain and frequency domain for SDMA based communications. At 810, the communication process assigns uplink slots in an uplink frame. The communication process can assign uplink slots in time, frequency, and space domains.

In some implementations, the communication process schedules acknowledgements for data received in the downlink slots to be transmitted in different uplink slots at different time periods in the uplink frame. In some implementations, the communication process schedules acknowledgements for data received in the downlink slots to be transmitted in different uplink slots in different frequency ranges in the same time period in the uplink frame. In some implementations, portions of an uplink frame are interspersed with portions of a downlink frame. In some implementations, a downlink frame is referred to as a downlink sub-frame. In some implementations, an uplink frame is referred to as an uplink sub-frame.

At 815, the communication process generates station records based on the assignments. At 820, the communication process generates a control frame that includes the station records. A control frame can include a station record for each client device. In some cases a control frame can include a station record associated with a multi-station group.

At 825, the communication process transmits the control frame. In some implementations, an AP transmits a control frame over multiple frequency sub-bands. At 830, the communication process transmits data in the downlink slots. Transmitting data in the downlink slots can include spatially steering a transmission vector. At 835, the communication process receives data in the uplink slots.

In a sounding procedure, a communication process can transmit a sounding packet in a downlink slot in accordance with a downlink slot assignment. A communication process can receive packets that are transmitted by wireless communication devices in accordance with corresponding uplink slot assignments. Received packets can include feedback packets that are derived from wireless channel estimations that are based on received versions of the sounding packet.

In some implementations, generating a control frame includes adding a record that describes a downlink slot assignment associated with a sounding packet. A record can indicate a group communication such as a broadcast communication or a multicast communication. In some implementations, generating a control frame includes adding multiple records that describe the identical downlink slot assignment, however, each record is addressed to a different device.

In some implementations, generating a control frame can include adding information to cause a first device to receive first data in a downlink frame via a first spatial wireless channel. Generating the control frame can include adding information to cause the first device to transmit an acknowledgement indication related to the first data in a first uplink slot of an uplink frame. Generating the control frame can include adding information to cause the second device to receive second data in the downlink frame via a second spatial wireless channel. Generating the control frame can include adding information to cause the second device to transmit an acknowledgement indication related to the second data in a second uplink slot of the uplink frame.

In some implementations, generating a control frame can include adding information to cause some devices to receive data in a frequency sub-band via different spatial wireless channels, e.g., SDMA, and to cause another device to receive data in a different frequency sub-band without spatial multiplexing, e.g., without SDMA. Therefore, a downlink frame can include a SDMA based frame and a non-SDMA based frame. In some implementations, a downlink frame can include SDMA based downlink slots and a non-SDMA based downlink slots.

FIG. 9A shows an example of an extended PSMP frame. A control frame such as a PSMP frame 900 can include information to allocate communication resources to wireless communication devices. A PSMP frame 900 includes a frame control and duration field 905, receiver address (RA) 910, transmitter address (TA) 915, basic service set identifier (BSSID) 920, and a Management Action Header (MAH) 925. In the PSMP frame 900, the RA 910 can be set to a broadcast address. A BSSID 920 can include a MAC address of a device such as an AP. The PSMP frame 900 includes a PSMP header 930 and one or more station records 935*a*, 935*b*, 935*n* for respective client devices. The PSMP frame 900 includes a cyclic redundancy check (CRC) 940.

In some implementations, the frame control and duration field 905 is a 4-byte field. In some implementations, the RA 910 is a 6-byte field, the TA 915 is a 6-byte field, and the BSSID 920 is a 6-byte field. In some implementations, the PSMP header 930 is a 2-byte field. In some implementations, a station record is a 8-byte field. In some implementations, the CRC 940 is a 4-byte field.

FIG. 9B shows an example of a PSMP header. A PSMP header 930 includes a N-STA 950, a More PSMP Indicator 952, and a PSMP sequence duration 954. In some implementations, N-STA 950 represents the number of station records that follow the PSMP header 930. In some implementations, N-STA 950 is a 5-bit field. In some implementations, a more PSMP indicator 952 is set to indicate whether there will be another PSMP sequence. The indicator 952 can be a 1-bit value. In some implementations, a PSMP sequence duration 954 is a 10-bit field. In some implementations, a PSMP sequence duration 954 value is in units of 8 microseconds.

FIG. 9C shows an example of a station record. A station record, e.g., a station information element, can include a type field 960 to indicate a presence of a station record. A station record can include information about a downlink transmission time (DTT), e.g., a downlink slot, For example, a station record can include a DTT start offset 962 and a DTT duration 964. A station record can include information about an uplink transmission time (UTT), e.g., an uplink slot. For example, a station record can include a UTT start offset 968 and a UTT duration 970. A station record can include a station identifier 966. A station record can include one or more reserved bits 972.

In some implementations, a type field 960 is a 2-bit field. In some implementations, a DTT start offset 962 is a 11-bit field and a DTT duration 964 is a 8-bit field. In some implementations, a station identifier (STA ID) 966 is a 16-bit field. In some implementations, a UTT start offset 968 is a 11-bit field and a UTT duration 970 is a 10-bit field.

FIG. 9D shows an example of a station record that includes a frequency sub-band field. A station record can include a type field 960, a DTT start offset 962, a DTT duration 964, a station identifier 966, a UTT start offset 968, UTT duration 970, and a frequency sub-band field 980. In some implementations, a frequency sub-band field 980 includes one or more bits. Different combinations of bit values for the frequency sub-band field 980 represent different frequency sub-bands.

In some implementations, a frequency sub-band field includes a 4-bit bitmap. In some implementations, each bit in a frequency sub-band field corresponds to a specific sub-band. For example, bit 2 of the bitmap can correspond to a second sub-band. In some implementations, a sub-band is assigned to a device if a corresponding sub-band bit in the bitmap is set to 1. Multiple sub-bands can be assigned to a device if two or more sub-band bits in the bitmap are set to 1. In some implementations, a device is required to use the same sub-band(s) for both downlink and uplink communications.

A frequency sub-band field can include two or more bitmaps. In some implementations, a frequency sub-band field can include a first 4-bit bitmap to indicate one or more allocated sub-bands for downlink communications and a second 4-bit bitmap to indicate one or more allocated sub-bands for uplink communications. In some implementations, a frequency sub-band field can be added into a group addressed station record to enable the allocation of one or more frequency resources for group-addressed communications.

FIG. 9E shows an example of a mapping between a group of frequency sub-bands and a frequency sub-band field. A frequency band can be partitioned into two or more frequency sub-bands 985a, 985b, 985c, 985d. For example, a 80 MHz channel is divided into four 20 MHz channels. In this example, an 80 MHz band that includes 256 OFDM tones is partitioned in to four different 20 MHz sub-bands 985a, 985b, 985c, 985d. Each sub-band 985a, 985b, 985c, 985d includes 64 OFDM tones.

A PSMP can include multiple station records that include frequency sub-band fields that assign different sub-bands to different devices. For example, a frequency sub-band field in a station record can include a frequency sub-band bitmap to assign one or more sub-bands 985a, 985b, 985c, 985d to a device. A sub-band bitmap can include bits 990a, 990b, 990c, 990d that respectively control assignments to the frequency sub-bands 985a, 985b, 985c, 985d. In some cases, a device is assigned to two or more frequency sub-bands to provide higher bandwidth, e.g., two 20 MHz sub-bands can provide 40 MHz in signal bandwidth.

Figure 10A:
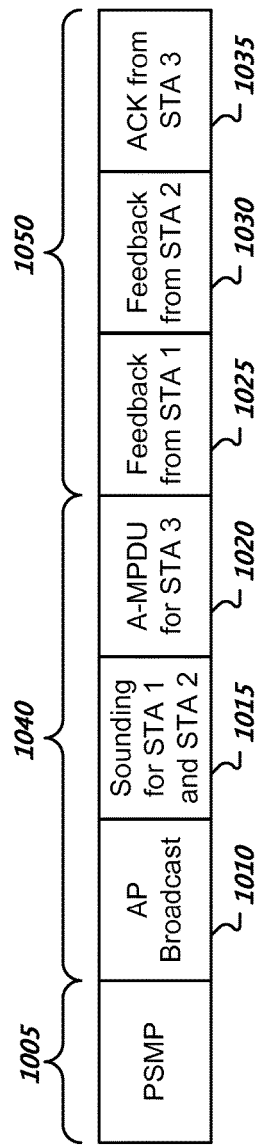
FIG. 10A shows an example of a communication sequence that includes downlink and uplink communications.

FIG. 10A shows an example of a communication sequence that includes downlink and uplink communications. A communication sequence can include a PSMP frame 1005, a downlink frame 1040, and an uplink frame 1050. A PSMP frame 1005 can include information that assigns devices to receive data in one or more downlink slots 1010, 1015, 1020 of a downlink frame 1040. In some implementations, a downlink frame 1040 can include the PSMP frame 1005 at the beginning of the downlink frame 1040. A PSMP frame 1005 can include information that identifies a downlink slot 1010 as including a broadcast communication for multiple devices. A PSMP frame 1005 can include information that assigns two or more devices to receive in the same downlink slot 1015. A PSMP frame 1005 can include information that assigns devices to transmit data in respective uplink slots 1025, 1030, 1035 of an uplink frame 1050.

In some implementations, an AP can send sounding packets to multiple devices, e.g., STA 1 and STA 2, in a downlink slot 1015 and send a data unit such as an A-MPDU to a different device, e.g., STA 3, in a subsequent downlink slot 1020. In response to the sounding packets, the AP can receive feedback data from a first device at a first uplink slot 1025, a second device at a second uplink slot 1030, and a third device at a third uplink slot 1035.

In some implementations, a sounding packet includes one or more Very High Throughput (VHT) fields such as VHT Signal Field (VHT-SIG), VHT Short Training Field (VHT-STF), VHT Long Training Field (VHT-LTF). The sounding packet can include Extended Long Training Fields (E-LTFs). For example, a sounding packet can include an E-LTF for each TX antenna to be sounded. In some implementations, subfield combinations in VHT-SIG fields can signal the number of E-LTFs in a sounding packet.

Figure 10B:
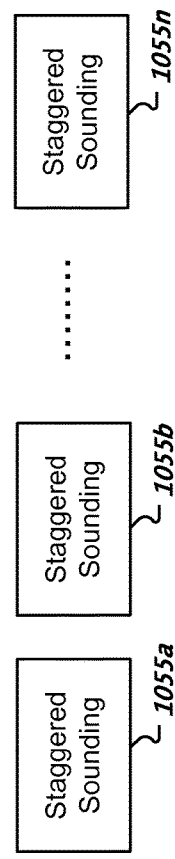
FIG. 10B shows an example of a downlink slot that includes staggered sounding packets.

FIG. 10B shows an example of a downlink slot that includes staggered sounding packets. A downlink slot can include sounding packets such as staggered sounding packets 1055a, 1055b, 1055n. An access point can use staggered sounding packets 1055a, 1055b, 1055n to transmit sounding data to client devices. In some implementations, a staggered sounding packet can include one or more of L-STF, L-LTF, and L-SIG. A staggered sounding packet can include one or more High Throughout (HT) fields such as HT Signal Field (HT-SIG) to signal that a VHT-SIG field is included in the sound packet. In some implementations, a VHT-SIG field is transmitted with a 90-degrees phase shift for Binary phase-shift keying (BPSK) modulation in each OFDM tone. In some implementations, an AP can rotate the VHT-SIG BPSK modulation constellation points in each subcarrier to the imaginary axis. A staggered sounding packet can include an E-LTF for each TX antenna to be sounded. The VHT-SIG field can include a sub-field that indicates the number of E-LTFs in a staggered sounding packet.

Figure 10C:
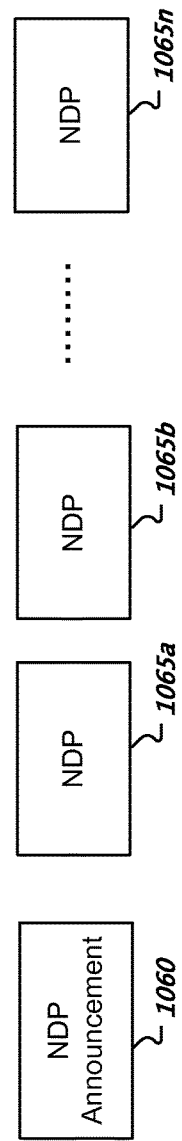
FIG. 10C shows an example of a downlink slot that includes null data packets.

FIG. 10C shows an example of a downlink slot that includes null data packets. A downlink slot can include sounding packets such as NDP sounding packets 1065a, 1065b, 1065n. An access point can use NDP sounding packets 1065a, 1065b, 1065n to transmit sounding data to client devices. In some implementations, a downlink slot includes a NDP announcement 1060 to communicate information about upcoming NDP sounding packets 1065a, 1065b, 1065n. In some implementations, a device can process the NDP announcement 1060 to determine whether processing an upcoming NDP sounding packet is required.

A PSMP sequence can include a PSMP frame and a sounding downlink slot. A PSMP frame can include a NDP announcement frame that provides information about a subsequent sounding downlink slot. The sounding downlink slot can include null date packets (NDPs). In some implementations, a NDP is referred to as a NDP frame. In some implementations, only devices assigned to a sounding downlink slot are required to process the NDP frames and send feedback during assigned uplink slots.

In some implementations, a NDP sounding packet can include one or more of L-STF, L-LTF, and L-SIG. A NDP sounding packet can include one or more VHT fields such as VHT-SIG1 and VHT-SIG2, VHT-STF, and multiple VHT-LTFs. Signaling fields in a NDP sounding packet such as VHT-SIG1 and VHT-SIG2 can be used to indicate the number of included VHT-LTFs. A NDP sounding packet can include a VHT-LTF for each TX antenna to be sounded. The VHT-LTFs can be used to determine a wireless channel matrix.

Figure 11:
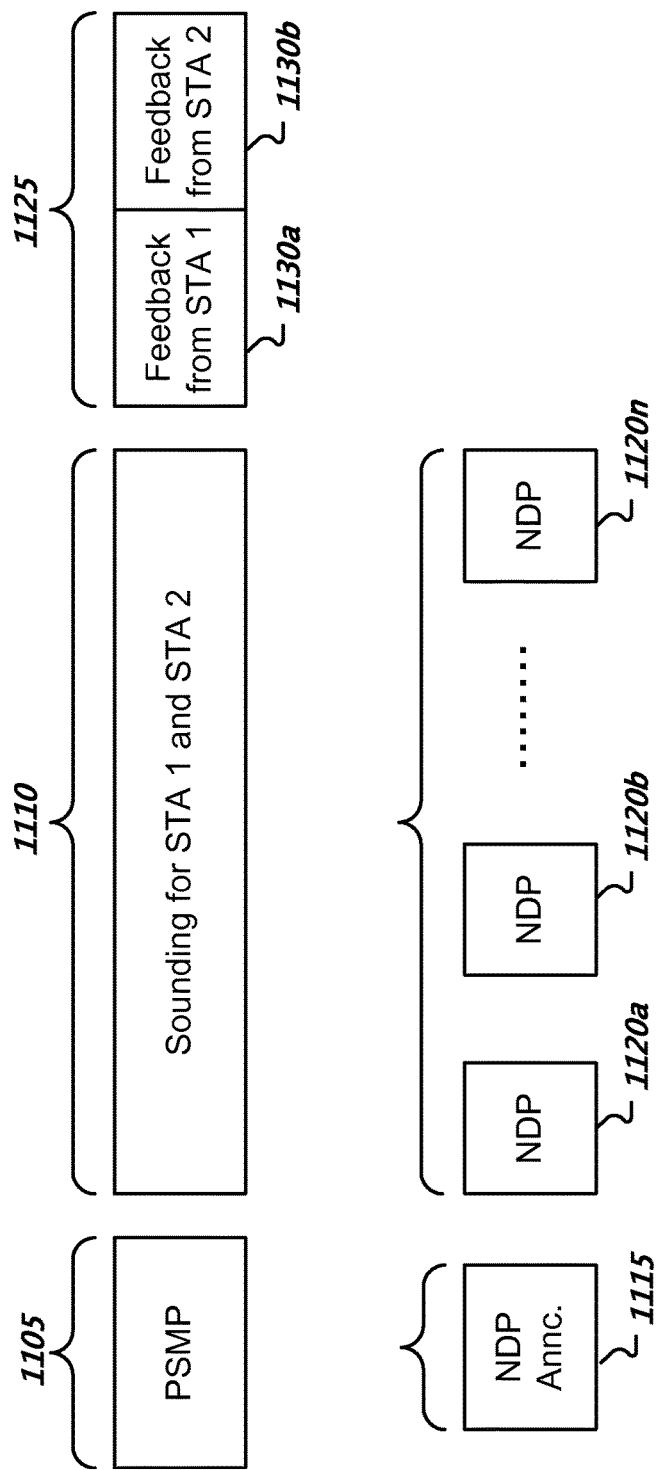
FIG. 11 shows an example of a communication sequence that includes a null data packet announcement in a control frame.

FIG. 11 shows an example of a communication sequence that includes a null data packet announcement in a control frame. An access point can use a control frame to announce a sounding procedure to client devices. A control frame, such as one based on a PSMP frame format, can include an announcement of a transmission of NDPs. A control frame such as a PSMP frame 1105 can include a NDP announcement 1115. The NDP announcement 1115 can include information relating to a sounding procedure.

An access point transmits a PSMP frame 1105 and, subsequently, transmits sounding data in a downlink frame 1110. In some implementations, the access point can transmit user data in the downlink frame 1110 to one or more client devices that are not participating in the sounding procedure. The PSMP frame 1105 indicates assignments of client devices to one or more downlink slots in the downlink frame 1110. For uplink communications, the PSMP frame 1105 indicates assignments of client devices to respective uplink slots 1130a, 1130b in an uplink frame 1125.

Reception of a NDP announcement 1115 by a client device can cause the client device to monitor a downlink frame 1110 for sounding data such as one or more NDP frames 1120a, 1120b, 1120n. For example, devices that are assigned to a downlink slot can receive NDP frames 1120a, 1120b, 1120n in the downlink slot. Based on the received one or more NDP frames, devices can send feedback during their assigned uplink slots. For example, a first device can send feedback in a first uplink slot 1130a. A second device can send feedback in a second uplink slot 1130b. In some implementations, the second uplink slot 1130b is subsequent to the first uplink slot 1130a in a time domain. In some implementations, the first uplink slot 1130a and the second uplink slot 1130b are assigned to different groups of OFDM subcarriers.

A transmitter can use one or more techniques to communicate sounding information with receivers. A transmitter can transmit sounding information such as NDP announcement frames, NDP sounding frames, or staggered sounding frames to two or more receivers.

In some implementations, a sounding frame can include a control structure, e.g., a bitmap control field, a partial virtual bitmap, or both, that identifies the receivers of the sounding frame or following sounding frames. A device, indicated as a receiver of a sounding frame, can send a sounding feedback packet during an assigned uplink slot. In some implementations, a sounding frame can include a PHY header, MAC header, and FCS. A MAC header can include a High Throughput (HT) control field, a bitmap control field, and a partial virtual bitmap field. In some implementations, a MAC header can include a Very High Throughout (VHT) control field, a bitmap control field, and a partial virtual bitmap field. In some implementations, a sounding frame is not required to include a MAC payload.

In NDP sounding, a transmitter can individually send NDP announcement frames to sounding devices in respectively assigned downlink slots. The transmitter can broadcast the NDP frames to multiple client devices during a broadcast downlink slot. In some implementations, only devices that received the NDP announcement frames are required to send sounding feedback during assigned uplink slots, respectively.

An access point can multicast sounding frames to devices. An access point can assign an address such as a multicast address or a group address to a group of two more sounding devices. Frames such as a NDP announcement frame or a staggered sounding frame can include the address of the group as the receiver address. A downlink slot used for sounding can be assigned to the address of the group.

A downlink slot used for sounding can be individually assigned to each device participating in a sounding procedure. In some implementations, a PSMP can include two or more station records that cause different devices to receive the same data in the same downlink slot.

In some implementations, a NDP announcement frame includes a broadcast address as a receiver address. In some implementations, a staggered sounding frame includes a broadcast address as a receiver address. If a downlink slot is assigned to two or more devices, an AP can broadcast the data of the downlink slot to these devices. In some implementations, devices that are not assigned to the downlink slot are not required to process frames received during the downlink slot. In some implementations, a transmitter can individually send NDP announcement frames to devices, respectively.

In some implementations, a reserved bit in HT field is used to indicate SDMA sounding with NDP frames following a group of announcement frames. In some implementations, NDP frames are transmitted following the last NDP announcement frame of the group.

In some implementations, a transmitter transmits multiple NDP announcements by using staggered sounding frames with each announcement being for one sounding device. In some implementations, NDP frames are transmitted following the last NDP announcement frame.

In some implementations, staggered sounding frames are transmitted following the last NDP announcement frame. Each device can treat the frames following its announcement frame as a sounding frame, whether it is a staggered sounding frame or a NDP frame.

In some implementations, sounding is repeated for each device in its individually assigned downlink slot and uplink slot.

Figure 12:
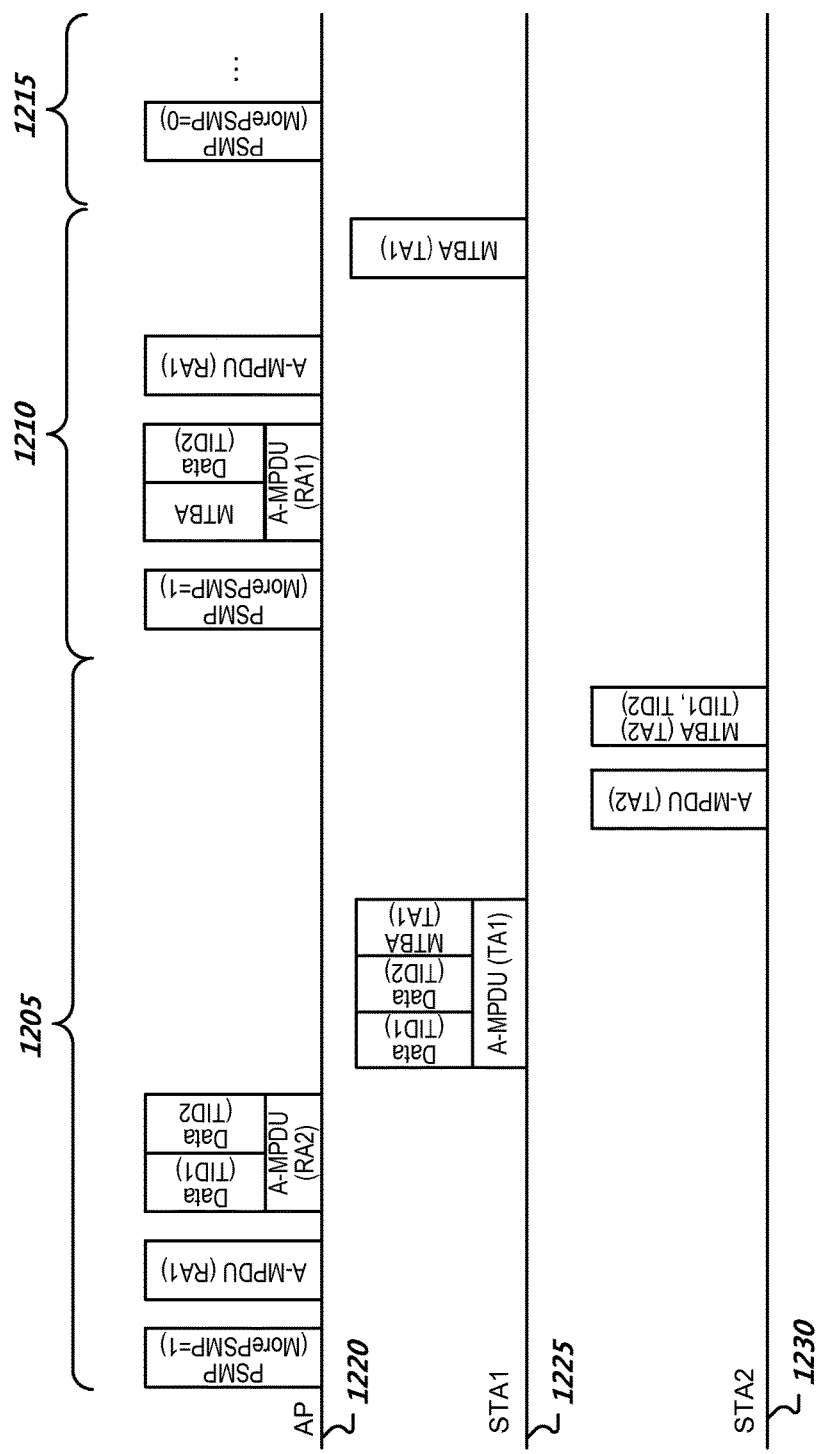
FIG. 12 shows an example of a communication timing diagram that includes data transmissions associated with traffic identifiers.

FIG. 12 shows an example of a communication timing diagram that includes data transmissions associated with traffic identifiers. Devices can use a Traffic Identifier (TID) to identify a traffic flow. A device can transmit data packets with different TIDs, respectively, in a downlink slot. Similarly, a device can transmit data packets with different respective TIDs, respectively, in an uplink slot. In some cases, a traffic flow is between an AP and a client device. An identifier such as TID1 can be used by multiple client devices at the same time, but nonetheless, refers to different traffic flows in the context of specific client devices.

A first PSMP sequence 1205 includes a PSMP frame that indicates an additional PSMP sequence will follow the sequence 1205. In the first PSMP sequence 1205, the access point 1220 transmits the PSMP frame. The access point 1220 transmits an aggregated MAC PDU (A-MPDU) to a first client device 1225 (e.g., STA1). To a second client device 1230 (e.g., STA2), the access point 1220 transmits data including an A-MPDU, data for a first traffic flow, and data for a second traffic flow.

The first client device 1225 sends an A-MPDU that includes data in two traffic flows (e.g., TID1 and TID2) and a Multiple Traffic ID Block Acknowledgement (MTBA). The MTBA can include acknowledgement information for information that the access point 1220 transmitted in the first PSMP sequence 1205.

The second client device 1230 sends an A-MPDU and a MTBA to the access point 1220. The MTBA can include acknowledgement information for multiple traffic flows. In some implementations, a MTBA can be aggregated in a related A-MPDU. The access point 1220 can acknowledgement uplink data from the devices 1225, 1230 in a following PSMP sequence 1210.

A second PSMP sequence 1210 includes a PSMP frame that indicates an additional PSMP sequence will follow the sequence 1210. In the second PSMP sequence 1210, the access point 1220 transmits the PSMP frame. The access point 1220 transmits, to the first client device 1225, data that includes an A-MPDU, MTBA, and data for TID2. The MTBA can include acknowledgement information for information received from the first device 1225 in the first PSMP sequence 1205. The access point 1220 transmits, to the second client device 1230, data that includes an A-MPDU. The first client device 1225 sends an A-MPDU.

A third PSMP sequence 1215 includes a PSMP frame with a more PSMP field set to zero. The access point 1220 and client devices 1225, 1230 can exchange data in the third PSMP sequence 1215.

A MTBA frame can include a MAC header, a block acknowledgement (BA) control field, and one or more TID records. A MAC header can include a frame control field, a duration field, a receiver address, and a transmitter address. A BA control field can include an acknowledgement policy field, a MTID field, a compression option field, and a field to indicate the number of TID records that follow. A TID record can include an information field, a BA starting sequence number, and a BA bitmap.

Figure 13:
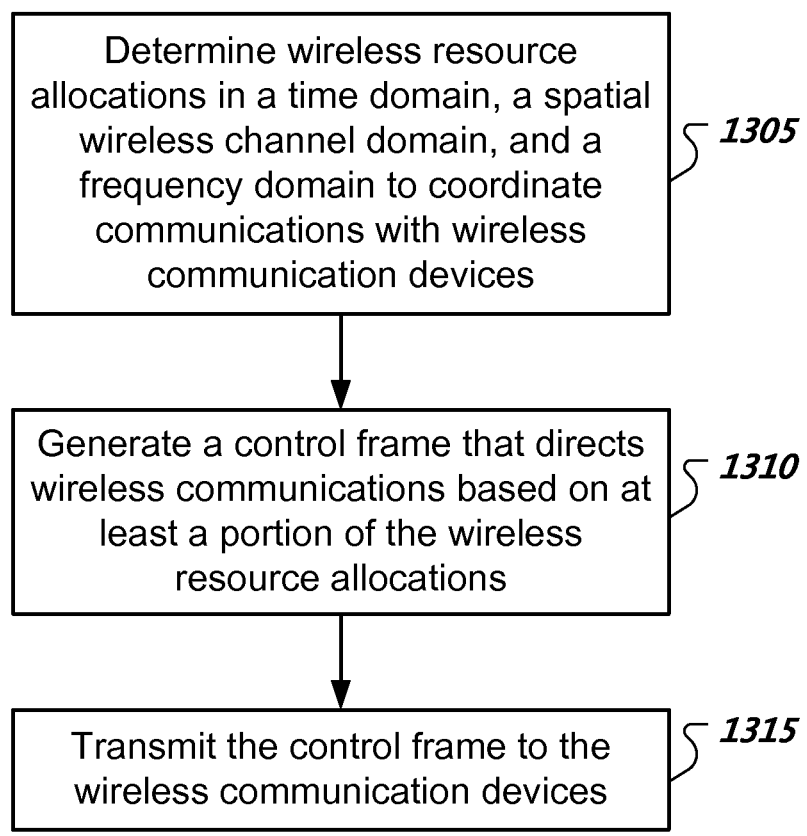
FIG. 13 shows an example of a process that includes allocating wireless resources.

FIG. 13 shows an example of a process that includes allocating wireless resources. At 1305, a process determines wireless resource allocations in a time domain, a spatial wireless channel domain, and a frequency domain to coordinate communications with wireless communication devices. Determining wireless resource allocations can include determining frequency allocations in the time domain. In some implementations, determining wireless resource allocations can include assigning an uplink slot to a frequency sub-band of a frequency band and assigning a different uplink slot to a different frequency sub-band of the frequency band. The frequency band can include orthogonal frequency division multiplexing (OFDM) tones.

At 1310, the process generates a control frame that directs wireless communications based on at least a portion of the wireless resource allocations. A control frame can include one or more downlink slot assignments and one or more uplink slot assignments. In some implementations, an access points generates a control frame to coordinate uplink responses, e.g., acknowledgements or sounding feedback, to a downlink communication such as a broadcast data packet or a multicast data packet. In some implementations, a control frame can include two or more uplink slot assignments. The two or more uplink slot assignments can be associated with two or more wireless communication devices, respectively.

At 1315, the process transmits the control frame to the wireless communication devices. In some implementations, transmitting the control frame includes broadcasting the control frame via a broadcast address.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
    transmitting a null data packet announcement to two or more wireless communication devices;
    transmitting a null data packet to the wireless communication devices, wherein the null data packet announcement causes each of the wireless communication devices to process the null data packet, wherein the null data packet announcement includes a multicast address or a broadcast address that causes each of the wireless communication devices to process the null data packet;
    transmitting a first frame to the wireless communication devices to cause the wireless communication devices to transmit, concurrently, respective feedback packets after an end of the null data packet, wherein the feedback packets are derived from wireless channel estimations that are based on received versions of the null data packet, wherein the feedback packets are assigned to different groups of one or more orthogonal frequency division multiplexing (OFDM) subcarriers;
    determining wireless resource allocations in a time domain, a spatial wireless channel domain, and a frequency domain to coordinate communications with the wireless communication devices, wherein the wireless resource allocations comprise spatial wireless channel allocations, downlink slot assignments, uplink slot assignments, and frequency sub-band assignments that correspond respectively to frequency sub-bands of a frequency band;
    generating information in one or more second frames that directs wireless communications based on the wireless resource allocations, wherein the information in the one or more second frames is configured to cause the wireless communication devices to receive respective data in downlink slots via spatial wireless channels in accordance with the wireless resource allocations, and wherein the information in the one or more second frames is configured to cause the wireless communication devices to transmit, concurrently, respective acknowledgement indications, in response to the respective data, in uplink slots in accordance with the wireless resource allocations, wherein the acknowledgement indications are assigned to different ones of the frequency sub-bands of the frequency band; and
    transmitting the one or more second frames to the wireless communication devices.

2. The method of claim 1, wherein the different ones of the frequency sub-bands of the frequency band each comprise one or more orthogonal frequency division multiplexing (OFDM) tones.

3. The method of claim 1, wherein at least a portion of the downlink slots overlap in the time domain and the frequency domain, and wherein the portion of the downlink slots are assigned to different spatial wireless channels.

4. The method of claim 1, wherein the one or more second frames comprise orthogonal frequency division multiplexing (OFDM) tones.

5. The method of claim 1, wherein the different ones of the frequency sub-bands are at least 20 MHz sub-bands.

6. An apparatus comprising:
    circuitry configured to determine wireless resource allocations in a time domain, a spatial wireless channel domain, and a frequency domain to coordinate communications with two or more wireless communication devices, wherein the wireless resource allocations comprise spatial wireless channel allocations, downlink slot assignments, uplink slot assignments, and frequency sub-band assignments that correspond respectively to frequency sub-bands of a frequency band; and
    circuitry configured to (i) send a null data packet announcement to the wireless communication devices, (ii) send a null data packet to the wireless communication devices, wherein the null data packet announcement causes each of the wireless communication devices to process the null data packet, wherein the null data packet announcement includes a multicast address or a broadcast address that causes each of the wireless communication devices to process the null data packet, (iii) send a first frame to the wireless communication devices to cause the wireless communication devices to transmit, concurrently, respective feedback packets after an end of the null data packet, wherein the feedback packets are derived from wireless channel estimations that are based on received versions of the null data packet, wherein the feedback packets are assigned to different groups of one or more orthogonal frequency division multiplexing (OFDM) subcarriers, and (iv) send information in one or more second frames that directs wireless communications based on the wireless resource allocations, wherein the information in the one or more second frames is configured to cause the wireless communication devices to receive respective data in downlink slots via spatial wireless channels in accordance with the wireless resource allocations, and wherein the information in the one or more second frames is configured to cause the wireless communication devices to transmit, concurrently, respective acknowledgement indications, in response to the respective data, in uplink slots in accordance with the wireless resource allocations, wherein the acknowledgement indications are assigned to different ones of the frequency sub-bands of the frequency band.

7. The apparatus of claim 6, wherein the different ones of the frequency sub-bands of the frequency band each comprise one or more orthogonal frequency division multiplexing (OFDM) tones.

8. The apparatus of claim 6, wherein at least a portion of the downlink slots overlap in the time domain and the frequency domain, and wherein the portion of the downlink slots are assigned to different spatial wireless channels.

9. The apparatus of claim 6, wherein the one or more second frames comprise orthogonal frequency division multiplexing (OFDM) tones.

10. The apparatus of claim 6, wherein the different ones of the frequency sub-bands are at least 20 MHz sub-bands.

11. The apparatus of claim 6, comprising:
circuitry configured to transmit the one or more second frames in one or more downlink slots in accordance with the downlink slot assignments; and
circuitry configured to receive the feedback packets transmitted by the wireless communication devices.

12. An apparatus comprising:
first circuitry configured to (i) receive a null data packet announcement that is transmitted to two or more wireless communication devices, (ii) receive a null data packet, the null data packet announcement causing each of the wireless communication devices to process the null data packet, the null data packet announcement including a multicast address or a broadcast address that causes each of the wireless communication devices to process the null data packet, (iii) receive a first frame that causes the wireless communication devices to transmit, concurrently, respective feedback packets after an end of the null data packet, and (iv) receive information in one or more second frames that directs wireless communications based on wireless resource allocations, wherein the wireless resource allocations are determined in a time domain, a spatial wireless channel domain, and a frequency domain to coordinate communications with two or more wireless communication devices, wherein the wireless resource allocations comprise spatial wireless channel allocations, downlink slot assignments, uplink slot assignments, and frequency sub-band assignments that correspond respectively to frequency sub-bands of a frequency band, wherein the information in the one or more second frames is configured to cause the wireless communication devices to receive respective data in downlink slots via spatial wireless channels in accordance with the wireless resource allocations, wherein the information in the one or more second frames is configured to cause the wireless communication devices to transmit, at a same time, respective acknowledgement indications, in response to the respective data, in uplink slots in accordance with the wireless resource allocations, and wherein the first circuitry is configured to receive data in a downlink slot of the downlink slots in accordance with the wireless resource allocations, wherein the acknowledgement indications are assigned to different ones of the frequency sub-bands of the frequency band; and
second circuitry configured to (i) transmit a feedback packet of the feedback packets and (ii) transmit data in an uplink slot of the uplink slots in accordance with the wireless resource allocations, wherein the feedback packet is derived from a wireless channel estimation that is based on a received version of the null data packet, wherein the feedback packets are assigned to different groups of one or more orthogonal frequency division multiplexing (OFDM) subcarriers.

13. The apparatus of claim 12, wherein the different ones of the frequency sub-bands of the frequency band each comprise one or more orthogonal frequency division multiplexing (OFDM) tones.

14. The apparatus of claim 12, wherein at least a portion of the downlink slots overlap in the time domain and the frequency domain, and wherein the portion of the downlink slots are assigned to different spatial wireless channels.

15. The apparatus of claim 12, wherein the one or more second frames comprise orthogonal frequency division multiplexing (OFDM) tones.

16. The apparatus of claim 12, wherein the different ones of the frequency sub-bands are at least 20 MHz sub-bands.

17. The apparatus of claim 12, comprising:
transceiver electronics that comprise the first circuitry and the second circuitry.

* * * * *